United States Patent
Lee et al.

(10) Patent No.: US 11,039,062 B2
(45) Date of Patent: Jun. 15, 2021

(54) ELECTRONIC DEVICE, AND METHOD FOR PROCESSING IMAGE ACCORDING TO CAMERA PHOTOGRAPHING ENVIRONMENT AND SCENE BY USING SAME

(71) Applicant: Samsung Electronics Co., Ltd, Suwon-si (KR)

(72) Inventors: Wooyong Lee, Hwaseong-si (KR); Inpyo Lee, Bucheon-si (KR); Byunghyun Min, Yongin-si (KR); Jeongyong Park, Suwon-si (KR); Hyoungjin Yoo, Suwon-si (KR); Gyubong Lee, Suwon-si (KR); Jonghoon Won, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/496,916

(22) PCT Filed: Mar. 23, 2018

(86) PCT No.: PCT/KR2018/003456
§ 371 (c)(1),
(2) Date: Sep. 23, 2019

(87) PCT Pub. No.: WO2018/174648
PCT Pub. Date: Sep. 27, 2018

(65) Prior Publication Data
US 2020/0128173 A1  Apr. 23, 2020

(30) Foreign Application Priority Data
Mar. 23, 2017 (KR) .................. 10-2017-0037161

(51) Int. Cl.
*H04N 5/232* (2006.01)
*H04N 9/64* (2006.01)

(52) U.S. Cl.
CPC ..... *H04N 5/23218* (2018.08); *H04N 5/23216* (2013.01); *H04N 5/23293* (2013.01); *H04N 9/646* (2013.01)

(58) Field of Classification Search
CPC .......... H04N 5/23218; H04N 5/23216; H04N 5/23293; H04N 9/646; H04N 1/6086; H04N 5/232933
See application file for complete search history.

(56) References Cited

U.S. PATENT DOCUMENTS 8,593,522 B2   11/2013  Ishii et al.
8,982,230 B2    3/2015  Toyoda
(Continued)

FOREIGN PATENT DOCUMENTS

JP   4880292 B2   12/2011
JP   5663193 B2   12/2014
(Continued)

OTHER PUBLICATIONS

International Search Report dated Jun. 22, 2018 in connection with International Patent Application No. PCT/KR2018/003456, 2 pages.
(Continued)

*Primary Examiner* — Yogesh K Aggarwal

(57) ABSTRACT

The present invention relates to an electronic device, and a method for processing an image according to a camera photographing environment and scene by using the same, and the electronic device according to various embodiments of the present invention comprises a camera module, a memory, and a processor electrically connected to the camera module and the memory, wherein the processor can be configured to: extract a first parameter for first image data
(Continued)

obtained using the camera module; detect situation information on the electronic device by using a sensor or a microphone functionally connected to the electronic device; detect a scene, corresponding to the first image data, among a plurality of predefined scenes; obtain a second parameter on the basis of the first parameter, the situation information, and the scene; generate, on the basis of the second parameter, second image data obtained using the camera module; and display the second image data by using a display functionally connected to the electronic device. Other various embodiments, in addition to the various embodiments of the present invention, are possible.

15 Claims, 13 Drawing Sheets

(56) References Cited

U.S. PATENT DOCUMENTS

| | | | |
|---|---|---|---|
| 9,426,385 B2 | 8/2016 | Stokman | |
| 9,848,128 B2 | 12/2017 | Lee et al. | |
| 9,927,867 B2 | 3/2018 | Yeom et al. | |
| 2007/0115371 A1 | 5/2007 | Enomoto et al. | |
| 2015/0381963 A1* | 12/2015 | Dal Mutto | G06T 5/50 348/46 |
| 2017/0208259 A1* | 7/2017 | Liu | H04N 5/2354 |
| 2017/0214837 A1* | 7/2017 | Tamura | H04N 5/2356 |

FOREIGN PATENT DOCUMENTS

| | | |
|---|---|---|
| JP | 5780764 B2 | 7/2015 |
| JP | 2017-017607 A | 1/2017 |
| KR | 10-2011-0035706 A | 4/2011 |
| KR | 10-2012-0007948 A | 1/2012 |
| KR | 10-1533642 B1 | 7/2015 |
| KR | 2016-0119105 A | 10/2016 |
| KR | 10-2017-0021125 A | 2/2017 |

OTHER PUBLICATIONS

Written Opinion of the International Searching Authority dated Jun. 22, 2018 in connection with International Patent Application No. PCT/KR2018/003456, 7 pages.

* cited by examiner

⟨910⟩

⟨920⟩

⟨930⟩

⟨940⟩

⟨1010⟩

⟨1020⟩

⟨1030⟩

⟨1040⟩

ELECTRONIC DEVICE, AND METHOD FOR PROCESSING IMAGE ACCORDING TO CAMERA PHOTOGRAPHING ENVIRONMENT AND SCENE BY USING SAME

CROSS-REFERENCE TO RELATED APPLICATIONS

This application is a 371 of International Application No. PCT/KR2018/003456 filed Mar. 23, 2018, which claims priority to Korean Patent Application No. 10-2017-0037161 filed on Mar. 23, 2017, the disclosures of which are herein incorporated by reference in their entirety.

BACKGROUND

1. Field

Various embodiments of the disclosure relate to an electronic device and method for processing an image in accordance with a camera photographing environment and a scene.

2. Description of Related Art

In general, an electronic device provides a camera function capable of taking a photograph of a subject to generate and store an image or a video. For example, the electronic device may provide, as camera setting values, default parameters set in a scene recognized in a photographed image. This allows a user to obtain a desired image photographed in an optimal environment.

However, because only default parameters are applied to the scene recognized in the photographed image, the effects being applicable to the image may be somewhat limited. That is, it is difficult to apply various parameters according to various conditions to the image during image shooting. Further, in order to apply different effects to the image during the image shooting, it is required to take the image again after stopping the shooting.

According to various embodiments of the disclosure, an electronic device is capable of performing a change of color in units of pixel with respect to an image, based on a parameter obtained through image analysis.

According to various embodiments of the disclosure, an electronic device is capable of acquiring parameters extracted through image analysis and variable parameters based on a scene recognized in an image.

According to various embodiments of the disclosure, an electronic device is capable of applying variable parameters to an image in real time.

SUMMARY

According to various embodiments of the disclosure, an electronic device may include a camera module, a memory, and a processor electrically connected to the camera module and the memory. The processor may be configured to extract a first parameter of first image data acquired using the camera module, to detect context information about the electronic device by using a sensor or a microphone functionally connected to the electronic device, to detect a scene corresponding to the first image data from a plurality of predefined scenes, to acquire a second parameter, based on the first parameter, the context information, and the scene, to generate second image data acquired using the camera module, based on the second parameter, and to display the second image data by using a display functionally connected to the electronic device.

According to various embodiments of the disclosure, a method for processing an image in accordance with a camera photographing environment and a scene in an electronic device may include extracting a first parameter of first image data acquired using a camera module; detecting context information about the electronic device by using a sensor or a microphone functionally connected to the electronic device; detecting a scene corresponding to the first image data from a plurality of predefined scenes; acquiring a second parameter, based on the first parameter, the context information, and the scene; and generating and displaying, on a display, second image data acquired using the camera module, based on the second parameter.

According to various embodiments of the disclosure, an electronic device may include a camera module, a touch screen display, a memory, and a processor electrically connected to the camera module, the touch screen display, and the memory. The processor may be configured to sequentially acquire one or more first images and one or more second images, both corresponding to external objects, by using the camera module, to determine a first scene corresponding to the one or more first images among a plurality of scenes, to identify first color information corresponding to the one or more first images, to generate a first filter, based on at least the first scene and the first color information, to correct at least a part of the one or more first images by using the first filter, to display the corrected at least the part of the one or more first images by using the touch screen display, to determine a second scene corresponding to the one or more second images among the plurality of scenes, to identify second color information corresponding to the one or more second images, to generate a second filter, based on at least the second scene and the second color information, to correct at least a part of the one or more second images by using the second filter, and to display the corrected at least the part of the one or more second images by using the touch screen display.

According to various embodiments of the disclosure, the electronic device can change the color of an image in units of pixels and thereby provide an image to which various effects are applied.

According to various embodiments of the disclosure, the electronic device can apply variable parameters to an image in real time and thereby perform image shooting without stopping the shooting so as to apply other effects.

According to various embodiments of the disclosure, by applying variable parameters to an image in real time, the electronic device can apply various effects depending on parameters of an input image even in case of the same scene.

DETAILED DESCRIPTION

Figure 1:
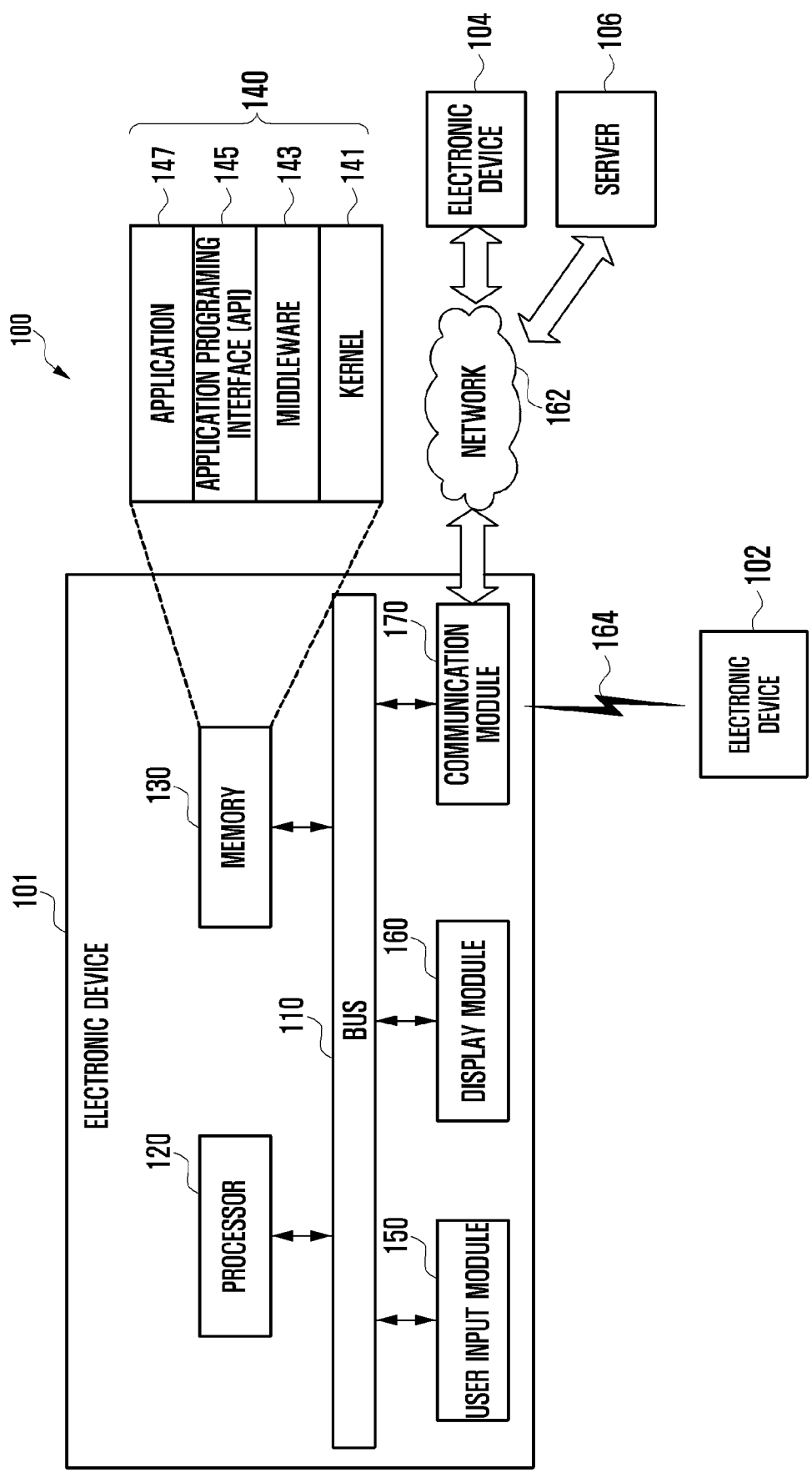
FIG. 1 is a block diagram illustrating a network environment including an electronic device according to various embodiments of the disclosure.

Hereinafter, various embodiments of the disclosure are described in detail with reference to accompanying drawings. The embodiments and terms used herein are not intended to limit the technology disclosed in specific forms and should be understood to include various modifications, equivalents, and/or alternatives to corresponding embodiments. In the drawings, similar reference numbers are used to indicate similar constituent elements.

In the disclosure, the terms such as "include", "have", "may include" or "may have" denote the presence of stated elements, components, operations, functions, features, and the like, but do not exclude the presence of or a possibility of addition of one or more other elements, components, operations, functions, features, and the like.

In the disclosure, the expression "A or B", "at least one of A and/or B", or "one or more of A and/or B" is intended to include any possible combination of enumerated items. For example, the expression "A or B", "at least one of A and B", or "at least one of A or B" may indicate all of (1) case of including at least one A, (2) case of including at least one B, or (3) case of including both at least one A and at least B.

In the disclosure, expressions such as "1st" or "first", "2nd" or "second", etc. may indicate various elements regardless of their sequence and/or importance and are used merely to distinguish one element from the others. For example, a first user device and a second user device may indicate different user devices regardless of their sequence or importance. For example, without departing from the scope of the disclosure, a first element may be referred to as a second element, and similarly a second element may be also referred to as a first element.

When it is mentioned that a certain (i.e., first) element is "(operatively or communicatively) coupled with/to" or "connected to" another (i.e., second) element, it will be understood that the first element is coupled or connected to the second element directly or via any other (i.e., third) element. On the other hand, when it is mentioned that a certain (i.e., first) element is "directly coupled with/to" or "directly connected to" another (i.e., second) element, any other (i.e., third) element does not exist between the certain element and another.

In the disclosure, the expression "configured to~" may be interchangeably used with other expressions "suitable for~", "having the capacity to~", "designed to~", "adapted to~", "made to~", or "capable of~". The expression "configured to (or set to)~" may not necessarily mean "specifically designed to~" in hardware. Instead, in some situations, the expression a device "configured to~" may mean that the device is "capable of~" with other devices or components. For example, a "processor configured to (or set to) perform A, B, and C" may mean a dedicated processor (e.g., an embedded processor) for performing a corresponding operation or a general-purpose processor (e.g., a central processing unit (CPU) or an application processor (AP)) which executes corresponding operations by executing one or more software programs which are stored in a memory device.

Terms used in the disclosure are used only to describe certain embodiments and may not be intended to limit the scope of other embodiments. The singular expressions may include plural expressions unless the context clearly dictates otherwise. Terms used herein, including technical or scientific terms, may have the same meaning as commonly understood by one of ordinary skill in the art. Among terms used herein, terms defined in a generic dictionary may be interpreted as having the same or similar meaning as the contextual meanings of the related art and, unless explicitly defined herein, may not be interpreted as ideally or excessively formal sense. In some cases, terms, even defined herein, are not construed to exclude embodiments of the disclosure.

According to various embodiments of the disclosure, an electronic device may include at least one of a smart phone, a tablet PC, a mobile phone, a video phone, an e-book reader, a desktop PC, a laptop PC, a netbook computer, a workstation, a server, a personal digital assistant (PDA), a portable multimedia player (PMP), an MP3 player, a medical device, a camera, or a wearable device. The wearable device may include at least one of an appcessory type device (e.g. a watch, a ring, a bracelet, an anklet, a necklace, glasses, contact lens, and head-mounted-device (HMD), a textile or clothes-integrated device (e.g., electronic clothes), a body-attached device (e.g., skin pad and tattoo), or a bio-implantable circuit.

In a certain embodiment, the electronic device may be home appliance including at least one of television (TV), a digital video disk (DVD) player, an audio player, an air conditioner, a cleaner, an oven, a microwave oven, a washing machine, an air cleaner, a set-top box, a home automation control panel, a security control panel, a media box (e.g., Samsung HomeSync™, Apple TV™, or Google TV™), game consoles (e.g., Xbox™, PlayStation™, an electronic dictionary, an electronic key, a camcorder, or an electronic frame.

According to another embodiment, the electronic device may include at least one of a medical device (such as portable medical measuring devices (including a glucometer, a heart rate monitor, a blood pressure monitor, or a body temperature thermometer), a magnetic resonance angiography (MRA) device, a magnetic resonance imaging (MM) device, a computed tomography (CT) device, a camcorder, or a microwave scanner), a navigation device, a global navigation satellite system (GNSS), an event data recorder (EDR), a flight data recorder (FDR), an automotive infotainment device, marine electronic equipment (such as marine navigation system or gyro compass), aviation electronics (avionics), security equipment, an automotive head unit, an industrial or household robot, a drone, an automatic teller machine (ATM), a point of sales (POS) terminal, or an Internet-of-things (IoT) device (such as electric bulb, sensor, sprinkler system, fire alarm system, temperature controller, street lamp, toaster, fitness equipment, hot water tank, heater, or boiler).

According to a certain embodiment, the electronic device may include at least one of furniture, a part of a building/structure, a part of a vehicle, an electronic board, an electronic signature receiving device, a projector, or a sensor (such as water, electricity, gas, or electric wave meters). According to various embodiments, the electronic device may be flexible or a combination of at least two of the aforementioned devices. According to a certain embodiment, the electronic device is not limited to the aforementioned devices.

Now, an electronic device according to various embodiments will be described in detail with reference to the accompanying drawings. In the disclosure, the term "user" may denote a person who uses the electronic device or a device (e.g., artificial intelligent electronic device) which uses the electronic device.

FIG. 1 is a block diagram illustrating a network environment 100 including an electronic device 101 according to various embodiments. Referring to FIG. 1, an electronic device 101, 102 or 104 or a server 106 may be connected to each other via a network 162 or short-range communication 164. The electronic device 101 may include a bus 110, a processor 120, a memory 130, an input/output interface 150, a display 160, and a communication interface 170. In an embodiment, the electronic device 101 may be configured without at least one of the aforementioned components or with another component. The bus 110 may include a circuit for interconnecting components 110 to 170 such that the components communicate signal (e.g., control message and data). The processor 120 may include at least one of a central processing device, an application processor, and a communication processor (CP). The processor 120 may execute operation related to the control of and/or communication among the other components constituting the electronic device 101 and perform data processing.

The memory 130 may include a volatile and/or non-volatile memory. The memory 130 may store a command or data associated with at least one of the components of the electronic device 101. According to an embodiment, the memory 130 may store software and/or programs 140. The programs 140 may include a kernel 141, a middleware 143, an application programming interface (API) 145, and/or an application program (or "application") 147. At least part of the kernel 141, middleware, and API 145 may be referred to as operating system. The kernel 141 may control or manage system resources (e.g., bus 110, processor 120, and memory 130) for use in executing operations or functions implemented in other programming modules (e.g., middleware 143, API 145, and application program 147). Further, the kernel 141 can provide an interface through which the middleware 143, the API 145, and/or the application 147 can access an individual element of the electronic device 101 and then control and/or manage system resources.

The middleware 143 may relay the data communicated between the API 145 or the application program 147 and the kernel 141. The middleware 143 may process at least one task request received from the application program 147 according to priority. For example, the middleware 143 may assign a priority to at least one of the application programs 147 for use of the system resources (e.g., the bus 110, the processor 120, and the memory 130) of the electronic device 101 and process the at least one task request according to the assigned priority. The API 145 may include an interface for controlling the functions provided by the kernel 141 and the middle 143 and includes at least one interface or function (e.g., command) for file control, window control, and video control, and text control, by way of example. The input/output interface 150 may relay a command or data input by a user or via an external electronic device to other component(s) of the electronic device 101 and output a command or data received from other component(s) of the electronic device 101 to the user or the external electronic device.

Examples of the display 160 may include a liquid crystal display (LCD), a light emitting diodes display (LED), an organic LED (OLED) display, a micro electro mechanical systems (MEMS) display, and an electronic paper display. The display 160 may display various contents (e.g., text, image, video, icon, and symbol) to the user by way of example. The display 160 may include a touch screen that is capable of receiving a touch, gesture, proximity, or hovering input made with an electronic pen or part of the user's body by way of example. The communication interface 170 may set up a communication channel between the electronic device 101 and an external device (e.g., first external electronic device 102, second external electronic device 104, and server 106). For example, the communication interface 170 may connect to the network 162 through a wireless or wired communication channel to communicate with the external electronic device (e.g., second external electronic device 104 and server 106).

Examples of the wireless communication may include cellular communications using at least one of LTE, LTE Advanced (LTE-A), code division multiple access (CDMA), wideband CDMA (WCDMA), universal mobile telecommunications system (UMTS), Wireless Broadband (WiBro), and global system for mobile communications (GSM). According to an embodiment, examples of the wireless communication may include communications using at least one of wireless fidelity (Wi-Fi), Bluetooth, Bluetooth low energy (BLE), Zigbee, near field communication (NFC), magnetic secure transmission, radio frequency (RF), and body area network (BAN). According to an embodiment, examples of the wireless communication may include GNSS communication. Examples of the GNSS may include a global positioning system (GPS), a global navigation satellite system (Glonass), a Beidou navigation satellite system (hereinafter, referred to as "Beidou"), and Galileo (the European global satellite-based navigation system). In the following description, the terms "GPS" and "GNSS" are interchangeably used. Examples of the wired communication may include communications using at least one of universal serial bus (USB), high definition multimedia interface (HDMI), recommended standard 233 (RS-232), power line communication, and plain old telephone service (POTS). The network 162 may be a telecommunication network including a computer network (e.g., LAN and WAN), Internet, and telephony network, by way of example.

Each of the first and second external electronic devices 102 and 104 may be identical to or different from the electronic device 101 in type. According to various embodiments, all or part of the operations being executed at the electronic device 101 may be executed at one or more other electronic devices (e.g., electronic devices 102 and 104 and server 106). According to an embodiment, if it is necessary for the electronic device 101 to execute a function or service automatically or in response to a request, the electronic device 101 may request to another device (e.g., electronic devices 102 and 104 and server 106) for executing at least part of related functions on its behalf or additionally. The other electronic device (e.g., electronic devices 102 and 104 and server 106) may execute the requested function or additional function and notify the electronic device 101 of the execution result. The electronic device 101 may provide the requested function or service with execution result in itself or after performing additional processing thereon. In order to accomplish this, it may be possible to use a cloud computing, a distributed computing, or a client-server computing technology.

Figure 2:
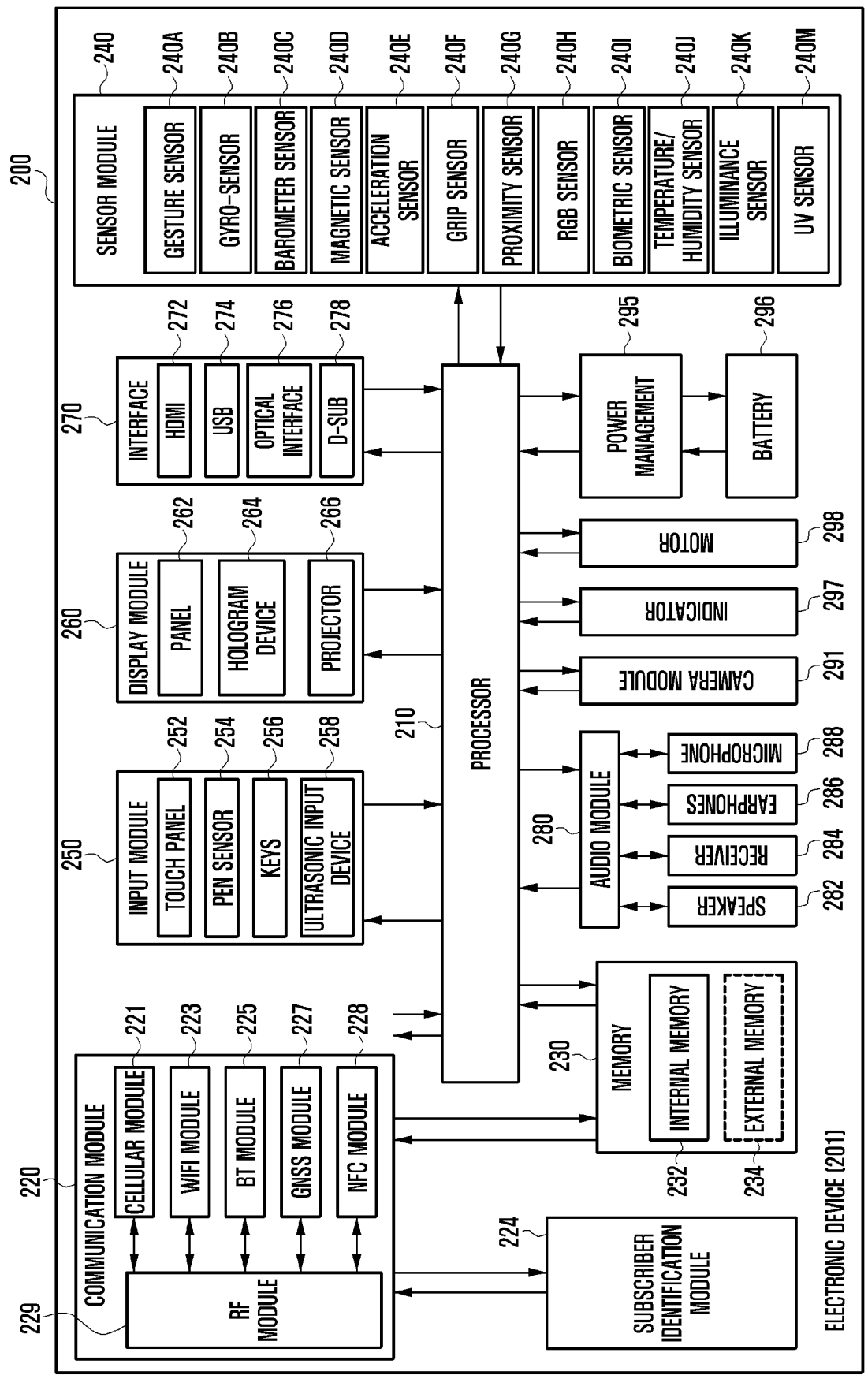
FIG. 2 is a block diagram illustrating an electronic device according to various embodiments of the disclosure.

FIG. 2 is a block diagram illustrating an electronic device 201 according to various embodiments.

The electronic device 201 may include all or part of the electronic device 101 depicted in FIG. 1. The electronic device 201 may include at least one processor (e.g., AP 210), a communication module 220, a subscriber identity module (SIM) 224, a memory 230, a sensor module 240, an input device 250, a display 260, an interface 270, an audio module 280, a camera module 291, a power management module 295, a battery 296, an indicator 297, and a motor 298. The processor 210 may execute the operation system or application program to control a plurality of hardware or software components connected to the processor 210 and perform various data processing and operations. The processor 210 may be implemented in the form of system on chip (SoC) by way of example. According to an embodiment, the processor 210 may also include a graphic processing unit (GPU) and/or an image signal processor. The processor 210 may include at least part (e.g., cellular module 221) of the components depicted in FIG. 2). The processor 210 may load the command or data received from at least one of other components (e.g., non-volatile memory) onto the volatile memory and store processed result data in the non-volatile memory.

The communication module 220 may have a configuration identical with or similar to that of the communication interface 170 by way of example. For example, the communication module 220 may include a cellular module 221, a Wi-Fi module 223, a Bluetooth module 225, a GNSS module 227, an NFC module 228, and an RF module 229. The cellular module 221 may provide a voice call service, a video call service, a text messaging service, and an Internet access service via a communication network, by way of example. According to an embodiment, the cellular module 221 may identity and authenticate the electronic device 201 and perform identification and authentication on the electronic device 201 in the communication network by means of the subscriber identity module (SIM) 224. According to an embodiment, the cellular module 221 may perform part of the functions of the processor 210. According to an embodiment, the cellular 221 may include a communication processor (CP). According to an embodiment, part of the cellular module 221, the Wi-Fi module 223, the Bluetooth module 225, the GNSS module 227, and the NFC module 228 (e.g., two or more) may be included in an integrated chip (IC) or an IC package. The RF module 229 may transmit/receive a communication signal (e.g., RF signal). The RF module 229 may include a transceiver, a power amplification module (PAM), a frequency filter, a low noise amplifier (LNA), and an antenna by way of example. According to an alternative embodiment, at least one of the cellular module 221, the Wi-Fi module 223, the Bluetooth module 225, the GNSS module 227, and the NFC module 228 may transmit/receive an RF signal via a separate RF module. The SIM 224 may include a card containing a subscriber identity module or an embedded SIM and contain unique identity information (e.g., integrated circuit card identifier (ICCID)) or subscriber information (e.g., international mobile subscriber identity (IMSI)).

The memory 230 (e.g., memory 130) may include an internal memory 232 and an external memory 234 by way of example. The internal memory 232 may include at least one of a volatile memory (e.g., DRAM, SRAM, and SDRAM), a non-volatile memory (e.g., one time programmable ROM (OTPROM)), PROM, EPROM, EEPROM, mask ROM, flash ROM, and flash memory, a hard drive, and a solid state drive (SSD) by way of example. The external memory 234 may include flash drive such as compact flash (CF), secure digital (SD), Micro-SD, Mini-SD, extreme digital (xD), multimedia card (MMC), and memory stick. The external electronic device 234 may be functionally or physically connected with the electronic device 201 via various interfaces.

The sensor module 240 may measure physical quantities or detects an operation state of the electronic device 201 and convert the measured or detected information to an electrical signal. The sensor module 240 may include at least one of a gesture sensor 240A, a gyro sensor 240B, a barometer sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240I, an illumination sensor 240K, and an ultraviolet (UV) sensor 240M. Additionally or alternatively, the sensor module 240 may include an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one sensor therein. According to an embodiment, the electronic device 201 may further include another processor configured to control the sensor module 240 as part of or separated from the processor 210, and the another processor may control the sensor module 240 while the processor 210 is in a sleep state.

The input device 250 may include a touch panel 252, a (digital) pen sensor 254, a key 256, or an ultrasonic input device 258 by way of example. The touch panel 252 may use at least one of capacitive, resistive, infrared, or ultrasonic methods by way of example. The touch panel 252 may further include a control circuit. The touch panel 252 may further include a tactile layer to provide tactile response to a user. The (digital) pen sensor 254 may include a sheet for recognition as part of a touch panel or a separate sheet for recognition. The key 256 may include a physical button, an optical key, or a keypad, by way of example. The ultrasonic input device 258 may detect ultrasonic waves generated by an input tool through a microphone (e.g., the microphone 288) and ascertain data corresponding to the detected ultrasonic waves.

The display 260 (e.g., the display 160) may include a panel 262, a hologram device 264, a projector 266, and a control circuit for controlling the aforementioned components. The panel 262 may be implemented to be flexible, transparent, or wearable. The panel 262 may include a touch panel 252 and at least one module. According to an embodiment, the panel 262 may include a pressure sensor (or force sensor) that measures the intensity of touch pressure by a user. The pressure sensor may be implemented integrally with the touch panel 252, or may be implemented as at least one sensor separately from the touch panel 252. The hologram device 264 may display a stereoscopic image in the air using a light interference phenomenon. The projector 266 may display an image by projecting light on a screen. The screen may be placed inside or outside the electronic device 201 by way of example. The interface 270 may include an HDMI 272, a USB 274, an optical interface 276, or a D-subminiature (D-sub) 278 by way of example. The interface 270 may be included in the communication interface 170 shown in FIG. 1 by way of example. Additionally or alternatively, the interface 270 may include a mobile high-definition link (MHL) interface, an SD card/MMC interface, or an infrared data association (IrDA) standard interface.

The audio module 280 may convert sounds into electrical signals and convert electrical signals into sounds. At least some components of the audio module 280 may be included in the input/output interface 145 shown in FIG. 1 by way of example. The audio module 280 may process sound information inputted/outputted through a speaker 282, a receiver 284, an earphone 286, or a microphone 288. The camera module 291, as a device for capturing a still image and a video image, may include at least one image sensor (e.g., a front sensor or a rear sensor), a lens, an image signal processor (ISP), or a flash (e.g., an LED or a xenon lamp). The power management module 295 may manage the power of the electronic device 201. The power management module 295 may include a power management IC (PMIC), a charger IC, or a battery or fuel gauge. The PMIC may support wired and/or wireless charging methods. Examples of the wireless charging method may include a magnetic resonance method, a magnetic induction method, and an electromagnetic method, and the PMIC may further include supplementary circuit such as a coil loop, a resonant circuit, and a rectifier. The battery gauge may measure a remaining capacity of the battery 296, charging voltage and current, and temperature of the battery by way of example. The battery 296 may include a rechargeable battery and/or a solar battery by way of example.

The indicator 297 may display a specific state of the electronic device 201 or part thereof (e.g., the processor 210), such as a booting state, a message state, or a charging state. The motor 298 may convert electrical signals into mechanical vibration and may generate vibration or haptic effect. The electronic device 201 may include a mobile TV-support device (e.g., a GPU) for processing media data generated in compliance with the standards such as digital multimedia broadcasting (DMB), digital video broadcasting (DVB), and mediaFlo™. Each of the above-mentioned components may be configured with at least one component and the name of a corresponding component may vary according to the type of an electronic device. According to various embodiments, the electronic device (e.g., electronic device 201) may be configured without part of the aforementioned components or with additional components; part of the components may be combined into one entity capable of executing the same functions of the components before being combined.

Figure 3:
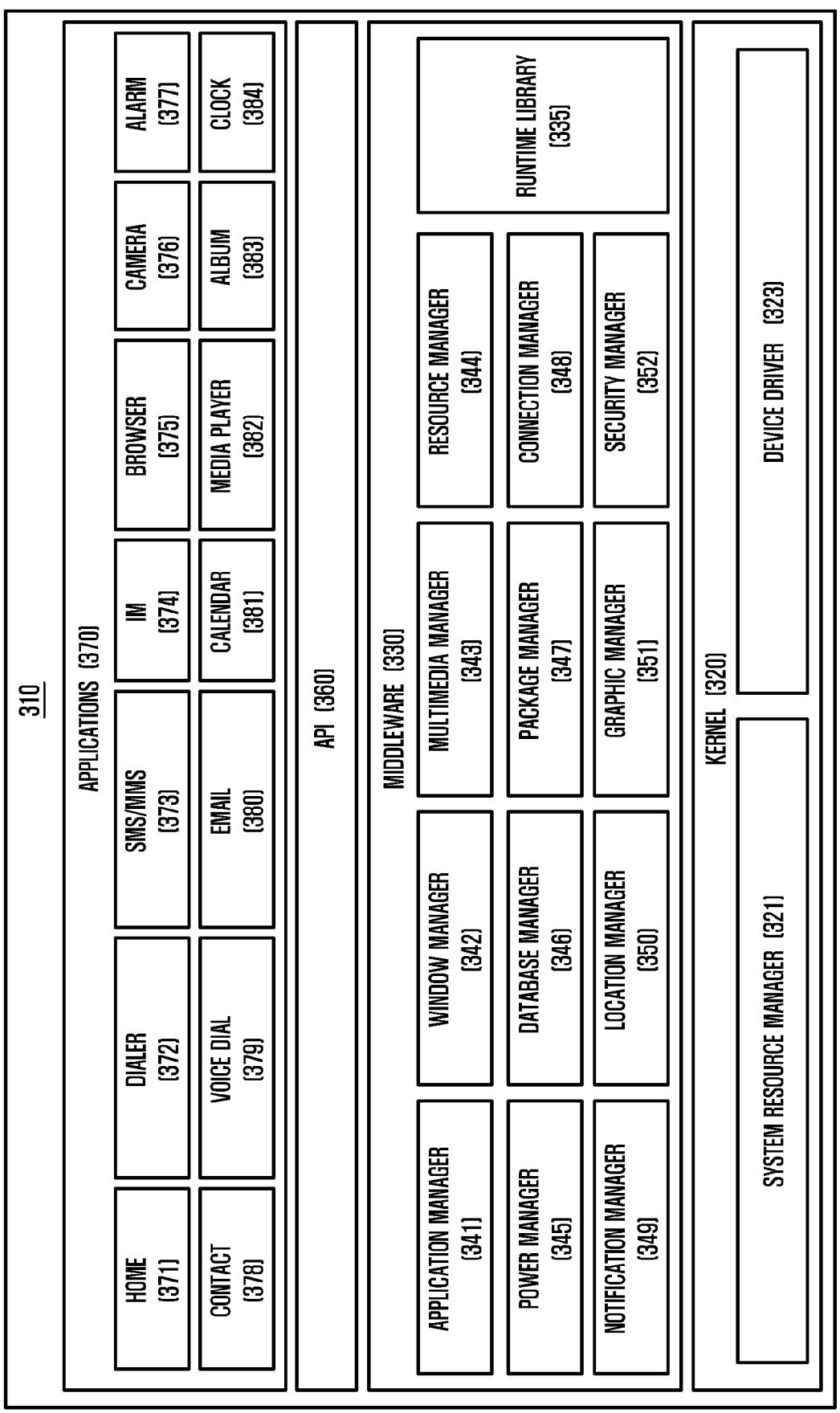
FIG. 3 is a block diagram illustrating a program module according to various embodiments of the disclosure.

FIG. 3 is a block diagram illustrating a program module according various embodiments.

According to an embodiment, the program module 310 (e.g., program 140) may include an operating system for controlling the resources of the electronic device (e.g. electronic device 101) and various applications (e.g., application program 147) running on the operating system. The operating system may include Android™, iOS™, Windows™, Symbian™, Tizen™, and Bada™ for example. In reference to FIG. 3, the program module 310 may include a kennel 320 (e.g., kernel 141), a middleware 330 (e.g., middleware 143), an API 360 (e.g., API 145), and an application 370 (e.g., application 147). At least part of the program module 310 may be pre-loaded on the electronic device or downloaded from an external electronic device (e.g., electronic devices 102 and 104).

The kernel 320 may include a system resource manager 321 a device driver 323 by way of example. The system resource manager 321 may control, assign, or withdraw the system resources. According to an embodiment of the present disclosure, the system resource manager 321 may include a process manager, a memory manager, and a pile system manager. The device driver 323 may include a display driver, a camera driver, a Bluetooth driver, a common memory driver, a USB driver, a keypad driver, a Wi-Fi driver, an audio driver, and an inter-process communication (IPC) driver. The middleware 330 may provide a function for use by the applications in common and various functions for allowing the applications 370 to use the restricted system resources of the electronic device efficiently through the API 360. According to various embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module for use by a compiler to add new functions with a programming language while the applications 370 are in running. The runtime library 335 may perform input/output management, memory management, and arithmetic function processing. The application manager 341 may manage the life cycles of the applications 370 by way of example. The window manager 342 may manage the GUI resources in use for screens. The multimedia manager 343 may check the formats of media files to encode or decode the media files using the codecs proper to the corresponding formats. The resource manager 344 may manage source codes of the applications 370 and memory space. The power manager 345 may manage battery capacity and power by way of example and provide power information necessary for the operation of the electronic device. According to an embodiment, the power manager 345 may interoperate with a basic input/output system (BIOS). The database manager 346 may generate, search, and modify a database for use by the applications 370 by way of example. The package manager 347 may manage installation and update of application distributed in the form of a package file.

The connectivity manager 348 may manage a wireless connection by way of example. The notification manager 349 may provide the user with events such as incoming message alarm, appointment alarm, and proximity alarm by way of example. The location manager 350 may manage location information of the electronic device. The graphic manager 351 may manage graphical effects and user interfaces to be provided to user by way of example. The security manager 352 may responsible for system security and user authentication by way of example. According to an embodiment, the middleware 330 may include a telephony manager for managing voice and video call functions of the electronic device and a middleware module capable of combining the functions of the aforementioned components. According to an embodiment, the middleware 330 may provide operation system type-specific modules. The middleware 330 may delete part of the existing components or add new components dynamically. The API 360 may provide operating system type-specific API program functions sets by way of example. For example, it may be possible to a set of APIs per platform for the case of the android or iOS and two or more sets of APIs per platform for the case of the Tizen.

The applications 370 may include a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, a watch 384, a health care (e.g., workout amount and blood sugar), environmental information provision application (e.g., atmospheric pressure, humidity, and temperature). According to an embodiment, the application 370 may include an information exchange application for supporting information exchange between the electronic device and an external electronic device. The information exchange application may include a notification relay application for relaying specific information to the external electronic device and a device management application for managing the external electronic device by way of example. The notification relay application may relay notification information generated by another application of the electronic device to the external electronic device or provide the user with the notification information received from the external electronic device. The device management application may manage the functions of the external electronic device (e.g., turn-on/off of the external electronic device in itself (or a component thereof) and brightness (or resolution) adjustment of the display) communicating with the electronic device and install, uninstall, or update the applications operating on the external electronic device by way of example. According to an embodiment, the application 370 may include an application (e.g., healthcare application of a mobile medical device) designated according to the property of the external electronic device. According to an embodiment, the applications 370 may include an application received from the external electronic device. At least part of the application module 310 may be implemented (e.g., executed) in the form of software, firmware, hardware, or a combination of at least two thereof and include a module, a program, a routine, a command set, or a process for performing at least one function.

The term "module" used in this disclosure may mean a unit including, for example, one or a combination of hardware, software, and firmware. The term "module" may be interchangeably used with other terms, for example, such as unit, logic, logical block, component, or circuit. The "module" may be the minimum unit, or a part thereof, of an integrally constructed component. The "module" may be the minimum unit, or a part thereof, for performing one or more functions. The "module" may be implemented mechanically or electronically. For example, according to the present disclosure, the "module" may include at least one of an application-specific integrated circuit (ASIC) chip, field-programmable gate arrays (FPGAs), and a programmable-logic device, which are known or to be developed later and perform particular functions.

According to various embodiments, at least a part of the device (e.g., modules or functions thereof) or the method (e.g., operations) may be implemented as instructions stored in a non-transitory computer-readable storage medium (e.g., the memory 130) in a programming module form. When the instructions are executed by a processor (e.g., 120), the processor may perform a function corresponding to the instructions.

The non-transitory computer-readable recording medium may include magnetic media such as a hard disk, a floppy disk, and a magnetic tape, optical media such as a CD-ROM and a DVD, magneto-optical media such as a floptical disk, and hardware devices specially configured to store and perform a program instruction. In addition, the program instructions may include high class language codes, which can be executed in a computer by using an interpreter, as well as machine codes made by a compiler. A module or programming module according to various embodiments may include or exclude at least one of the above-discussed components or further include any other component.

According to various embodiments, the operations performed by the module, programming module, or any other component according to various embodiments may be executed sequentially, in parallel, repeatedly, or by a heuristic method.

Figure 4:
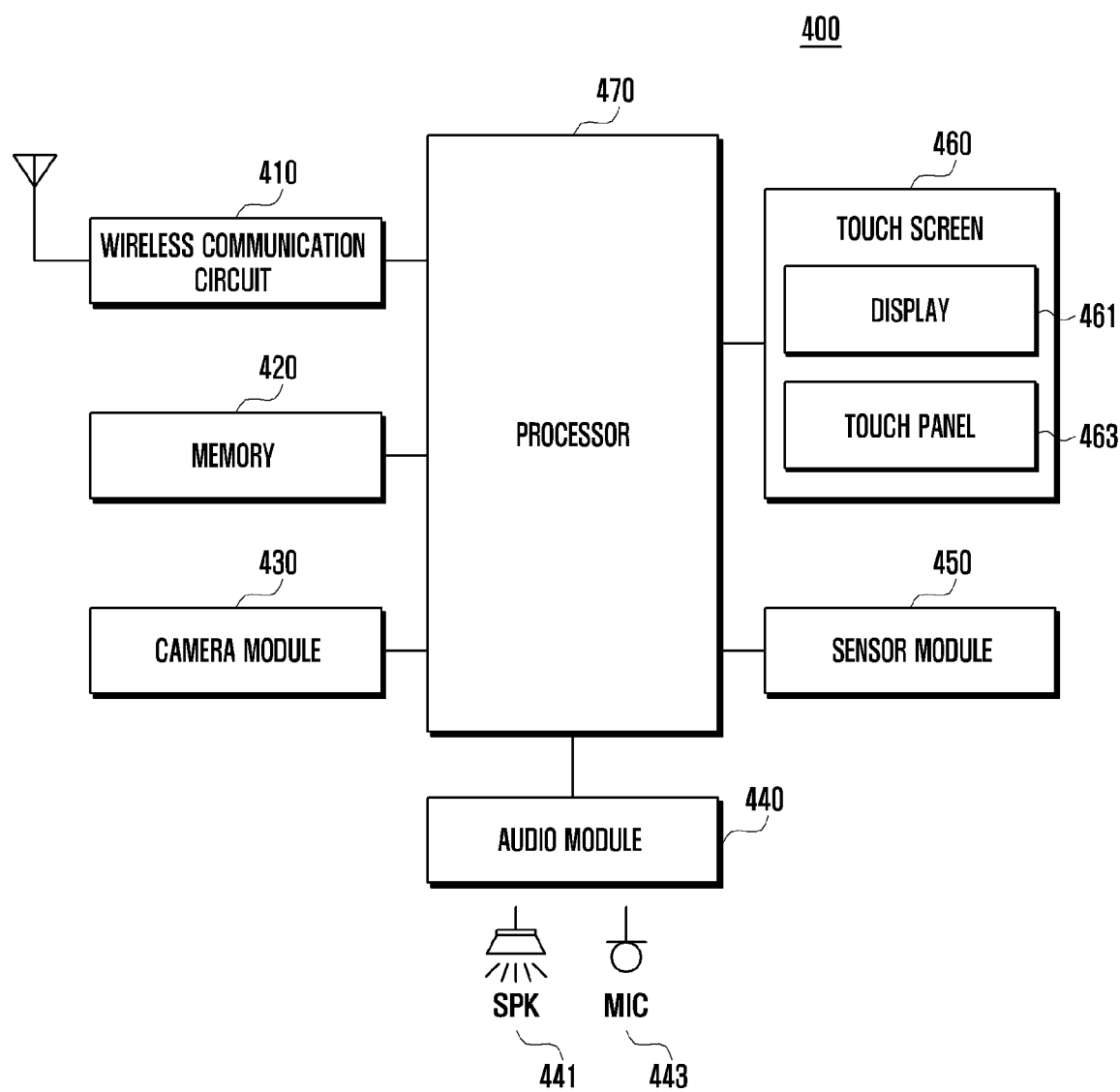
FIG. 4 is a block diagram illustrating an electronic device according to various embodiments of the disclosure.

FIG. 4 is a block diagram illustrating an electronic device according to various embodiments of the disclosure.

Referring to FIG. 4, an electronic device 400 (e.g., the electronic device 101 in FIG. 1, the electronic device 201 in FIG. 2) may include a wireless communication circuit 410, a memory 420, a camera module 430 (e.g., the camera module 291 in FIG. 2), an audio module 440, a sensor module 450 (e.g., the sensor module 240 in FIG. 2), a touch screen display 460, and a processor 470 (e.g., the processor 120 or 210).

According to various embodiments, the wireless communication circuit (e.g., the communication interface 170 in FIG. 1, the communication module 220 in FIG. 2) may connect communication between the electronic device 400 and an external electronic device (e.g., the electronic device 102 or 104 in FIG. 1) or a server 480 (e.g., the server 106 in FIG. 1).

According to various embodiments, the memory 420 (e.g., the memory 130 in FIG. 1, the memory 230 in FIG. 2) may store scene data, e.g., a plurality of scenes or scene categories, to be used as reference values for determining a scene of image data.

According to various embodiments, the memory 420 may store an algorithm for acquiring a second parameter, based on a first parameter of first image data, a scene of the first image data, and/or context information of the electronic device 400.

According to various embodiments, the memory 420 may store the acquired second parameter.

According to various embodiments, the memory 420 may store a filter generated from the second parameter.

According to various embodiments, the memory 420 may store first image data photographed with the first parameter and also store second image data to which the second parameter, acquired based on the first parameter of the first image data, the scene of the first image data, and/or the context information of the electronic device 400, is applied.

According to various embodiment, the camera module 430 (e.g., the camera module 291 in FIG. 2) may deliver a captured image, as a preview screen, to a display 461 so as to allow the user to view the captured image. When receiving an input of a shooting request, the camera module 430 may generate image data by capturing an image at the time of the shooting request input.

According to various embodiments, the audio module 440 (e.g., the audio module 280 in FIG. 2) may include a speaker 441 (e.g., the speaker 282 in FIG. 2) and a microphone 443 (e.g., the microphone 288 in FIG. 2).

According to various embodiments, the microphone 443 may acquire sound data from the outside of the electronic device 400 and deliver the acquired sound data to the processor 470.

According to various embodiments, the sensor module 450 may include an illumination sensor (e.g., the illumination sensor 240K in FIG. 2).

According to various embodiments, the illumination sensor may measure the illumination of an ambient environment around the electronic device 400 and deliver the measured illumination to the processor 470.

According to various embodiment, the touch screen display 460 may include a display 461 (e.g., the display 160 in FIG. 1, the display 260 in FIG. 2) and a touch panel 463 (e.g., the input device 250 in FIG. 2) as an integrated form.

According to various embodiments, the touch screen display 460 may display a preview image captured through the camera module 430 and first image data acquired through the camera module 430 in response to a shooting request input. The touch screen display 460 may also display second image data acquired through the camera module 430 based on the second parameter. The second parameter may be acquired based on the first parameter of the first image data, the scene of the first image data, and/or the context information of the electronic device 400.

According to various embodiments, the processor 470 (e.g., the processor 120 in FIG. 1, the processor 210 in FIG. 2) may control the overall operation of the electronic device 400, control a signal flow between internal components of the electronic device 400, perform data processing, and control power supply from a battery to such components.

According to various embodiments, the processor 470 may extract the first parameter from the first image data acquired using the camera module 430. For example, the first parameter of the first image data may include at least one of hue, saturation, contrast, color information (e.g., red, green, blue (RGB)), an RGB average, brightness, or face information.

According to various embodiments, the processor 470 may acquire the context information about an ambient environment of the electronic device 400. For example, the processor 470 may acquire the context information (e.g., indoor or outdoor) of the electronic device 400 through the sensor module 450 or the microphone 443.

According to various embodiments, the processor 470 may detect the scene from the first image data. For example, based on a plurality of scenes previously stored in the memory 420, the processor 470 may detect the scene of the first image data acquired through the camera module 430.

According to various embodiments, the processor 470 may acquire the second parameter, based on the first parameter of the first image data, the context information of the electronic device 400, and/or the scene of the first image data. The second parameter may be a parameter for editing at least a part of pixels in the first image data or editing the color, contrast, contour, etc. of an object contained in the first image data.

According to various embodiments, the processor 470 may generate the second image data acquired through the camera module 430, based on the acquired second parameter, and then display the generated second image data on the touch screen display 460. The processor 470 may store, in the memory 420, both the first image data based on the first parameter and the second image data newly generated based on the second parameter from the first image data.

According to various embodiments, the processor 470 may detect an input for fixing the second parameter while displaying the second image data, and then maintain a state in which the second parameter is applied. In addition, the processor 470 may detect an input for releasing the fixed second parameter while maintaining the second parameter applied state, and then acquire a third parameter at the time of the release input. Then, based on the acquired third parameter, the processor 470 may generate third image data acquired through the camera module 430 and display it on the touch screen display 460.

According to various embodiments, using the camera module 430, the processor 470 may sequentially acquire one or more first images and one or more second images, both corresponding to external objects. Then, the processor 470 may identify a first scene and first color information corresponding to the one or more first images and generate a first filter based thereon. Then, using the generated first filter, the processor 470 may correct at least a part of the one or more first images and display it on the touch screen display 460.

According to various embodiments, the processor 470 may identify a second scene and second color information corresponding to the acquired one or more second images and generate a second filter based thereon. Then, using the generated second filter, the processor 470 may correct at least a part of the one or more second images and display it on the touch screen display 460.

Figure 5:
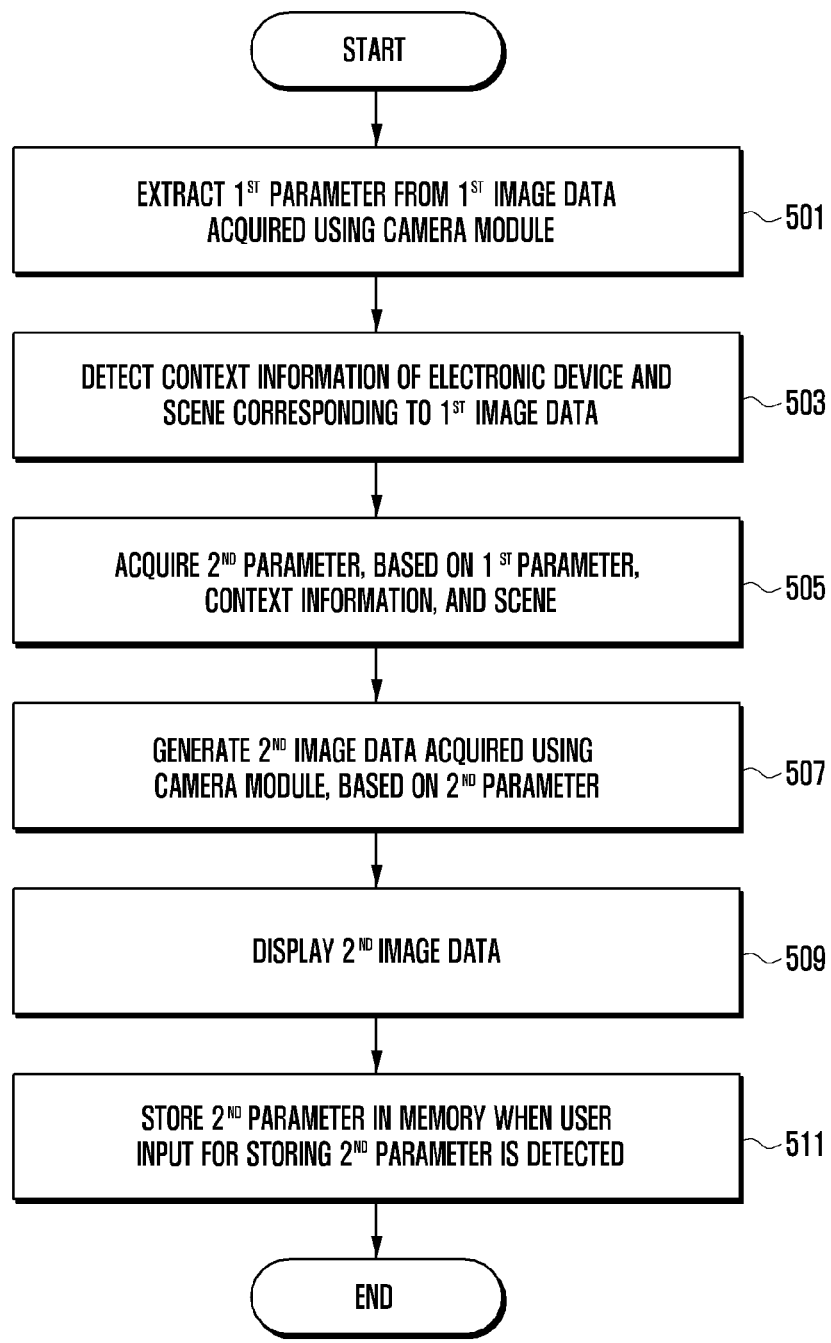
FIG. 5 is a flow diagram illustrating an image processing method according to various embodiments of the disclosure.

FIG. 5 is a flow diagram illustrating an image processing method according to various embodiments of the disclosure.

Referring to FIG. 5, at operation 501, an electronic device (e.g., the processor 120, 210, or 470) may extract a first parameter from first image data acquired using a camera module (e.g., the camera module 430). For example, the first parameter of the first image data may include at least one of hue, saturation, contrast, color information (e.g., RGB), an RGB average, brightness, or face information.

According to various embodiments, at operation 503, the electronic device (e.g., the processor 120, 210, or 470) may detect context information of the electronic device and/or a scene of the first image data.

According to various embodiments, the electronic device may acquire the context information thereof from a sensor module (e.g., the sensor module 450 in FIG. 4). The context information may include an indoor position and an outdoor position. For example, the electronic device may measure the illumination of an ambient environment around the electronic device through an illumination sensor (e.g., the illumination sensor 240K in FIG. 2) of the sensor module and thereby determine whether the electronic device is in an indoor position or an outdoor position. Alternatively, based on sound data acquired from a microphone (e.g., the microphone 443 in FIG. 4) of an audio module (e.g., the audio module 440 in FIG. 4), the electronic device may determine whether the electronic device is in an indoor position or an outdoor position.

According to various embodiments, the electronic device may detect the scene of the first image data. For example, a memory (e.g., the memory 420 in FIG. 4) may store scene data, e.g., a plurality of scenes, to be used as reference values for determining a scene of image data. For example, the scenes may include a portrait, a night view, a landscape, a backlit portrait, a night portrait, a backlight, a macro, a weak lighting, a spotlight, and the like. The electronic device may detect the scene corresponding to the first image data acquired using the camera module, based on the plurality of scene categories previously stored in the memory.

According to various embodiments, when there are a plurality of scenes detected from the first image data, the electronic device may determine, as the scene of the first image data, a scene having a higher priority among the plurality of detected scenes. According to various embodiments, the priorities of scenes may be predefined. Alternatively, the priorities of the scenes may be defined by the user. For example, when two scenes, a portrait and a landscape, are detected from the first image data, and when the portrait has a higher priority than the landscape, the electronic device may determine that the scene of the first image data is the portrait.

According to various embodiments, at operation 505, the electronic device (e.g., the processor 120, 210, or 470) may acquire a second parameter, based on the first parameter of the first image data, the context information of the electronic device, and the scene of the first image data.

According to various embodiments, the second parameter may be a parameter for changing at least some pixels in the first image data.

According to various embodiments, at operation 507, the electronic device (e.g., the processor 120, 210, or 470) may generate second image data acquired using the camera module, based on the acquired second parameter.

According to various embodiments, the electronic device may generate the second image data modified from the first image data by performing an operation, such as correction, editing, converting, enhancement, or adjustment, on the first image data in accordance with the second parameter.

According to various embodiments, at operation 509, the electronic device (e.g., the processor 120, 210, or 470) may display the second image data on a display (e.g., the touch screen display 460 in FIG. 4).

According to various embodiments, the electronic device may store, in the memory, the first image data with the first parameter and the second image data to which the second parameter is applied.

According to various embodiments, at operation 511, the electronic device (e.g., the processor 120, 210, or 470) may store the second parameter when a user input for storing the second parameter is detected.

According to various embodiments, the electronic device may store the second parameter in the memory as a filter.

According to various embodiments, the electronic device may post-process the first image data stored in the memory, based on the second parameter stored in the memory. For example, while an operation of acquiring the second parameter is performed based on the first parameter of the first image data, the scene of the first image data, and/or the context information of the electronic device, it is impossible to apply in real time the acquired second parameter to any image data (e.g., 710 in FIG. 7) acquired using the camera module. Therefore, the electronic device may store the second parameter in the memory and then perform post-processing on the image data (e.g., 710 in FIG. 7).

According to various embodiments, the above operation 511 may or may not be performed depending on whether the user input for storing the second parameter is detected or not.

According to various embodiments, the electronic device may repeat the above-described operations 501 to 511 until an input for ending the image shooting is detected.

According to various embodiments, the electronic device may detect an input for fixing the second parameter for the second image data. For example, the electronic device may have a virtual item (e.g., a pin) for fixing the second parameter in a screen for displaying the second image data on the display. When an input for selecting the item is detected, the electronic device may generate and display the image data acquired using the camera module based on the second parameter. At this time, the operation of extracting parameters of the image data acquired from the camera module, the operation of detecting the context information of the electronic device, and/or the operation of detecting the scene of the image data may be performed in the background.

According to various embodiments, when an input for deselecting the item is detected, the electronic device may acquire a new parameter (e.g., a third parameter), based on a parameter of image data acquired at the time of the deselection or before the deselection, a scene of the image data, and/or context information of the electronic device.

Then, based on the acquired new parameter (e.g., the third parameter), the electronic device may generate third image data acquired using the camera module and display the generated third image data.

Figure 6:
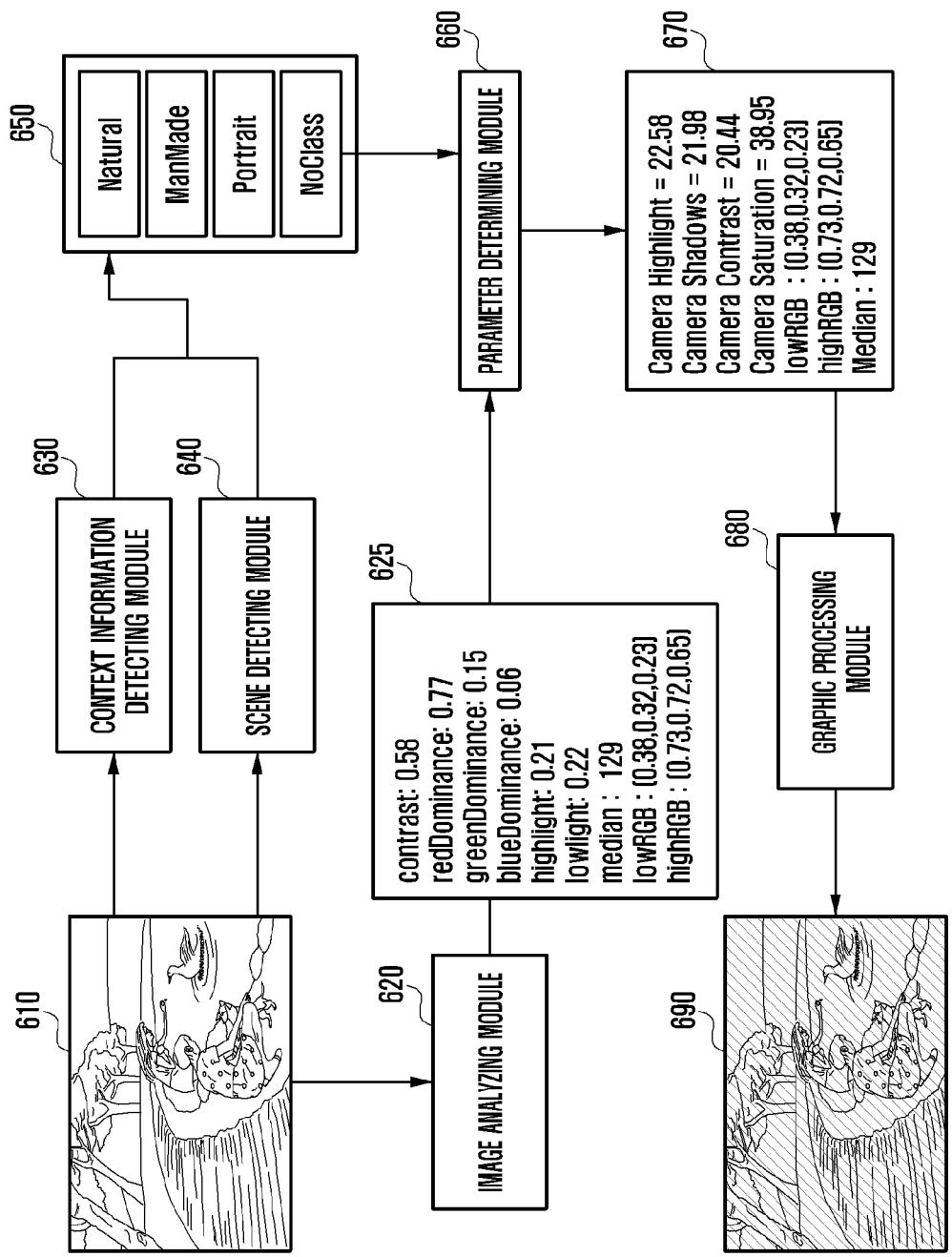
FIG. 6 is a block diagram illustrating an image processing method according to various embodiments of the disclosure.

FIG. 6 is a block diagram illustrating an image processing method according to various embodiments of the disclosure.

Referring to FIG. 6, a processor (e.g., the processor 470 in FIG. 4) of an electronic device (e.g., the electronic device 400 in FIG. 4) may include an image analyzing module 620, a context information detecting module 630, a scene detecting module 640, a scene classifying module 650, a parameter determining module 660, or a graphic processing module 670.

According to various embodiments, the image analyzing module 620 may analyze an image 610 acquired using a camera module (e.g., the camera module 430 in FIG. 4). By analyzing the image 610, the image analyzing module 620 may extract parameters 625 of the image 610. These parameters 625 of the image 610 may include contrast, redDominance, greenDominance, blueDominance, highlight, lowlight, median, lowRGB, and highRGB.

According to various embodiments, the electronic device may calculate a saturation level to be applied to the image, by using redDominance, greenDominance, and blueDominance, and define the color dominance of the image, based on the calculated saturation level. Also, by using highlight and lowlight, the electronic device may define the amount of darkness and brightness that appear in the image. Also, by using median which indicates an average intensity value of the image, the electronic device may perform split toning. Also, by using lowRGB and highRGB which indicate an average RGB in highlight and lowlight, the electronic device may calculate a tint intensity.

According to various embodiments, the image analyzing module 620 may deliver the extracted parameters 625 of the image 610 to the parameter determining module 660.

According to various embodiments, the context information detecting module 630 may detect context information with respect to the image, e.g., whether it is indoor or outdoor, and deliver the detected context information to the scene classifying module 650.

According to various embodiments, the scene detecting module 640 may detect a scene of the image 610 and deliver the detected scene to the scene classifying module 650. For example, the scene may include a portrait, a night view, a landscape, a backlit portrait, a night portrait, a backlight, a macro, a weak lighting, a spotlight, and the like.

According to various embodiments, based on information received from the context information detecting module 630 and the scene detecting module 640, the scene classifying module 650 may determine the scene of the image 610 in accordance with predefined scene categories (e.g., natural, manmade, portrait, noclass). Then, the scene classifying module 650 may deliver the determined scene to the parameter determining module 660.

According to various embodiments, the parameter determining module 660 may acquire second parameters 670, based on the parameters 625 of the image 610 received from the image analyzing module 620 and the scene received from the scene classifying module 650. For example, the second parameters 670 may include camera highlight, camera shadows, camera contrast, camera saturation, median, lowRGB, and highRGB. For example, the parameter determining module 660 may acquire the second parameters 670 through an algorithm for acquiring the second parameters.

According to various embodiments, the parameter determining module 660 may deliver the acquired second parameters 670 to the graphic processing module 680 (e.g., a graphic processing unit (GPU)). The graphic processing module 680 may generate a new image 690 acquired using the camera module based on the second parameters 670 and display the new image 690 on a display (e.g., the touch screen display 460 in FIG. 4).

Figure 7:
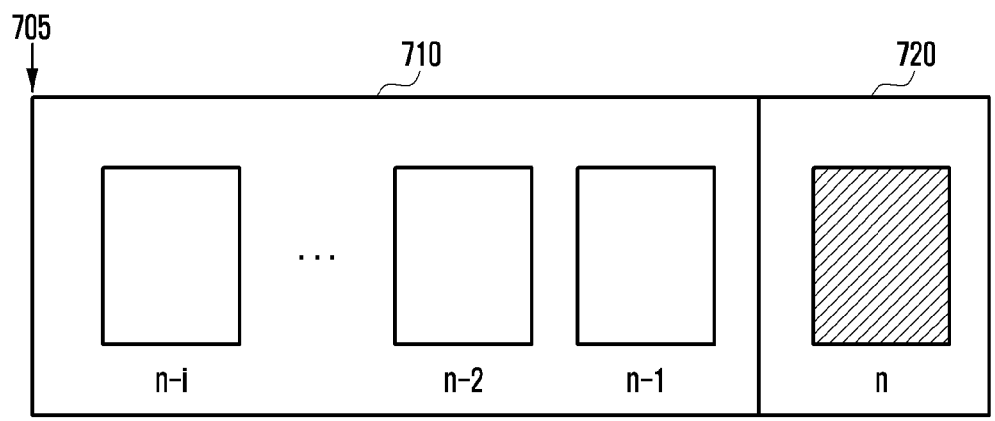
FIG. 7 is a diagram illustrating a method of calculating a parameter average variation for image data according to various embodiments of the disclosure.

FIG. 7 is a diagram illustrating a method of calculating a parameter average variation for image data according to various embodiments of the disclosure.

According to various embodiments, when the second image data generated based on the second parameter is newly displayed in a state where the first image data acquired using the camera module (e.g., 430 in FIG. 4) is displayed, a screen flicker may occur, for example, due to a sense of difference. In order to eliminate such a sense of difference, the electronic device (e.g., the processor 120, 210, or 470) may calculate an average variation of the second parameter to gradually change and display from the first image data to the second image data. For example, according to various embodiments, the electronic device may calculate the average variation, based on Equation 1 below.

$$AV_n = \frac{\sum_{i=n-4}^{n} Params_i}{n}$$

Equation 1

In Equation 1, '$AV_n$' denotes an average variation of each parameter applied at the $n^{th}$ input time, 'n' denotes an index of a currently input frame, and '$Params_i$' denotes a result of calculation through the $i^{th}$ input image.

Referring to FIG. 7, the electronic device may detect an input 705 for image shooting through the camera module. The electronic device may store sections 710 (e.g., n-i, ... , n-2, n-1) for displaying the first image data acquired using the camera module in a buffer, and detect the parameters of the first image data, the context information of the electronic device, and/or the scene of the first image data. Based on this, the electronic device may calculate the average variation of the second parameter through Equation 1 and apply the calculated average variation at the time point (e.g., n 720) for applying the second parameter. That is, based on the calculated average variation, the electronic device may generate and display the second image acquired using the camera module.

According to various embodiments, the electronic device may store the average variation of the second parameter in the memory so as to use it in post-processing the first image data 710 (e.g., n-i, ... , n-2, n-1) (e.g., image data to which the average variation of the second parameter has been not yet applied) stored in the butter.

Although the time for applying the average variation is described above in connection with the input for image shooting through the camera module, this is exemplary only. Alternatively, for example, when a change in environments is detected during the image shooting, the electronic device may calculate an average variation of the second parameter and, based on the calculated average variation, control the image data to be gradually changed and displayed. This environmental change may include at least one of a detection of a specific object, a pixel change in image data, or a change in a scene.

Figure 8:
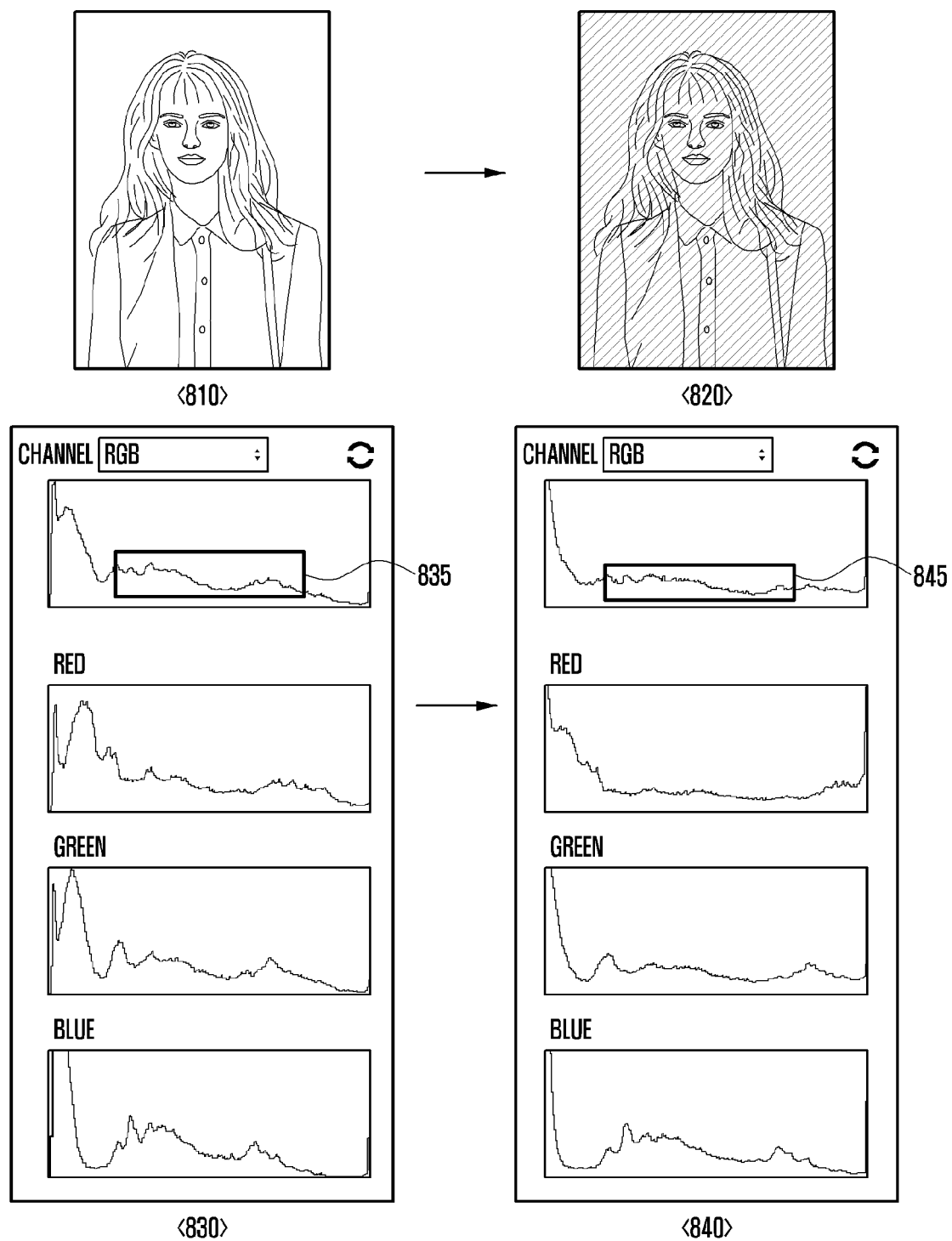
FIG. 8 is a diagram illustrating an image processing method according to various embodiments of the disclosure.

FIG. 8 is a diagram illustrating an image processing method according to various embodiments of the disclosure.

According to various embodiments, FIG. 8 shows a method for processing image data in case where a portrait (i.e., a face of a certain person) is detected from the image data acquired using the camera module (e.g., 430 in FIG. 4) and the context information indicates an outdoor position.

Referring to FIG. 8, the electronic device (e.g., the processor 120, 210, or 470) may acquire image data 810 by using the camera module. The electronic device may detect a face from the image data 810.

According to various embodiments, the image analyzing module (e.g., 620 in FIG. 6) may extract first parameters from the image data 810. For example, the first parameters of the image data 810 may be as shown in Table 1 below.

TABLE 1

| meanFace Hue | 4.0 | Median | 92 |
|---|---|---|---|
| Highlight | 0.20 | lowRGB | (0.30, 0.32, 0.22) |
| Lowlight | 0.24 | highRGB | (0.80, 0.79, 0.75) |

According to various embodiments, the image analyzing module may deliver the extracted first parameters of the image data 810 to the parameter determining module (e.g., 660 in FIG. 6).

According to various embodiments, the context information detecting module (e.g., 630 in FIG. 6) may determine the context information of the electronic device as an outdoor position and then deliver it to the scene classifying module (e.g., 650 in FIG. 6). In addition, the scene detecting module (e.g., 640 in FIG. 6) may determine the scene of the image data 810 as a portrait and then deliver it to the scene classifying module.

According to various embodiments, the scene classifying module may determine the scene to be a portrait through a predefined algorithm, based on the received context information and the received scene.

According to various embodiments, the scene classifying module may deliver the determined scene, e.g., a portrait, to the parameter determining module.

According to various embodiments, the parameter determining module may acquire second parameters through an algorithm as shown in Table 2 below, based on the first parameters received from the image analyzing module and the scene (e.g., a portrait) received from the scene classifying module.

TABLE 2

For PORTRAIT Scene following equations are used for calculating Artist Params
meanFaceHue= meanFaceHue;
arParams.shadow= (highlight*100)/2.0f;
arParams.highlight= (lowlight*100)/2.0f;
arParams.lowR= lowR;
arParams.lowG= lowG;
arParams.lowB= lowB;
arParams.highR= highR;
arParams.highG= highG;
arParams.highB= highB;

As a portrait is detected from the image data 810, the algorithm for acquiring the second parameters may maintain the color and tone of a facial region, increase the hue of surrounding pixels, and thereby increase the saturation and the contrast. The second parameters acquired through the above algorithm may be as shown in Table 3 below.

TABLE 3

| Camera Highlight | 12.0 | Median  | 92                 |
|------------------|------|---------|--------------------|
| Camera Shadows   | 10.0 | lowRGB  | (0.30, 0.27, 0.18) |
| meanFaceHue      | 4.0  | highRGB | (0.77, 0.69, 0.54) |

The parameter determining module may deliver the acquired second parameters to the graphic processing module (e.g., 680 in FIG. 6).

According to various embodiments, the graphic processing module may generate, based on the second parameters, a new image data 820 acquired using the camera module. The electronic device may display the generated image data 820.

According to various embodiments, comparing a histogram 830 for color information of the image data 810 with a histogram 840 for color information of the new image data 820 generated based on the second parameters, color information 835 of the facial region detected in the image data 810 is corrected based on the second parameters and thereby evenly dispersed as seen from color information 845 of the facial region detected in the new image data 820.

Figure 9:
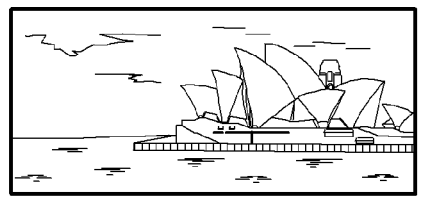
FIG. 9 is a diagram illustrating an image processing method according to various embodiments of the disclosure.
Figure 9:
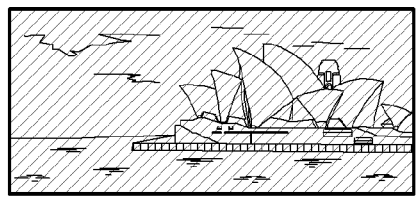
Figure 9:
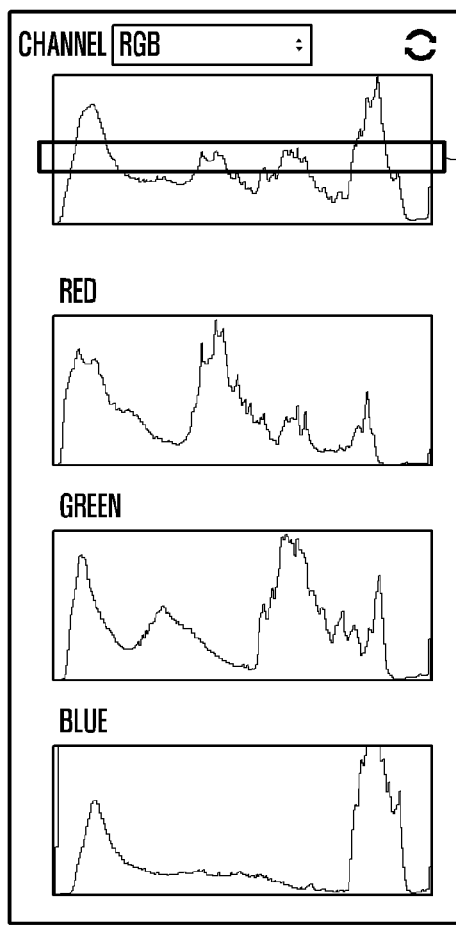
Figure 9:
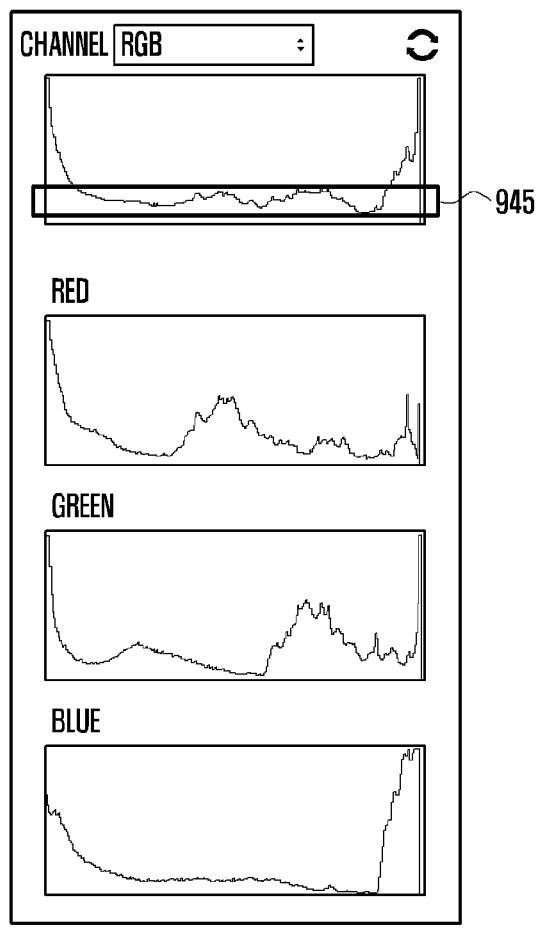

FIG. 9 is a diagram illustrating an image processing method according to various embodiments of the disclosure.

According to various embodiments, FIG. 9 shows that a dominant color of pixels in image data 910 acquired using the camera module (e.g., 430 in FIG. 4) is blue, the context information is an outdoor position, and the scene is natural.

Referring to FIG. 9, the image analyzing module (e.g., 620 in FIG. 6) may extract first parameters from the image data 910. For example, the first parameters of the image data 910 may be as shown in Table 4 below.

TABLE 4

| Contrast       | 0.83 | Highlight | 0.22               |
|----------------|------|-----------|--------------------|
| redDominance   | 0.02 | Lowlight  | 0.21               |
| greenDominance | 0.08 | Median    | 143                |
| blueDominance  | 0.90 | lowRGB    | (0.21, 0.27, 0.36) |
|                |      | highRGB   | (0.63, 0.67, 0.72) |

According to various embodiments, the image analyzing module may deliver the extracted first parameters of the image data 910 to the parameter determining module (e.g., 660 in FIG. 6).

According to various embodiments, the context information detecting module (e.g., 630 in FIG. 6) may determine the context information of the electronic device as an outdoor position and then deliver it to the scene classifying module (e.g., 650 in FIG. 6). In addition, the scene detecting module (e.g., 640 in FIG. 6) may determine the scene of the image data 910 as natural and then deliver it to the scene classifying module.

According to various embodiments, the scene classifying module may determine the scene to be natural through a predefined algorithm, based on the received context information and the received scene.

According to various embodiments, the scene classifying module may deliver the determined scene, e.g., natural, to the parameter determining module.

According to various embodiments, the parameter determining module may acquire second parameters through an algorithm as shown in Table 5 below, based on the first parameters and the scene (e.g., natural).

TABLE 5

For Natural Scene following equations are used for calculating Artist Params
saturation_green= (greenDominance*100);
saturation_red= (redDominance*100);
saturation_blue= (blueDominance*100);
arParams.saturation= (max(saturation_red, saturation_green))/2.0f;
arParams.contrast= (contrast*100)/2.0;
float normalizer= 2.0f*highlight+1.0f;
arParams.contrast= (arParams.contrast/normalizer)
arParams.shadow= (highlight*100);
arParams.highlight= (lowlight*100);
arParams.lowR= lowR;
arParams.lowG= lowG;
arParams.lowB= lowB;
arParams.highR= highR;
arParams.highG= highG;
arParams.highB= highB;

Because the contrast is at a proper level, the color dominance is blue, the highlight/shadow regions are appropriate, and the scene is a natural scene, the algorithm for acquiring the second parameters may determine the camera saturation, based on the red saturation and the green saturation, and increase the highlight/shadow by the same level. The second parameters acquired through the above algorithm may be as shown in Table 6 below.

TABLE 6

| Camera Highlight  | 32.0  | Median  | 133                |
|-------------------|-------|---------|--------------------|
| Camera Shadows    | 18    | lowRGB  | (0.14, 0.19, 0.24) |
| Camera Contrast   | 25.27 | highRGB | (0.52, 0.62, 0.80) |
| Camera Saturation | 1.05f |         |                    |

The parameter determining module may deliver the acquired second parameters to the graphic processing module (e.g., 680 in FIG. 6).

According to various embodiments, the graphic processing module may generate, based on the second parameters, a new image data 920 acquired using the camera module. The electronic device (e.g., the processor 120, 210, or 470) may display the generated image data 920.

According to various embodiments, comparing a histogram 930 for color information of the image data 910 with a histogram 940 for color information of the new image data 920 generated based on the second parameters, a portion 935 of the histogram 930 corresponding to a blue region which is a color dominance in the image data 910 is corrected based on the second parameters and thereby evenly dispersed as seen from a corresponding portion 945 of the histogram 940 in the new image data 920.

Figure 10:
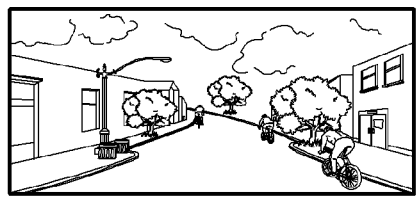
FIG. 10 is a diagram illustrating an image processing method according to various embodiments of the disclosure.
Figure 10:
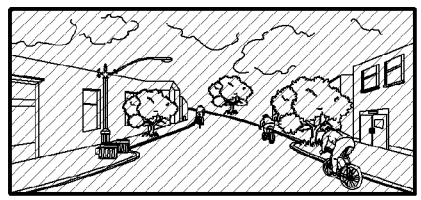
Figure 10:
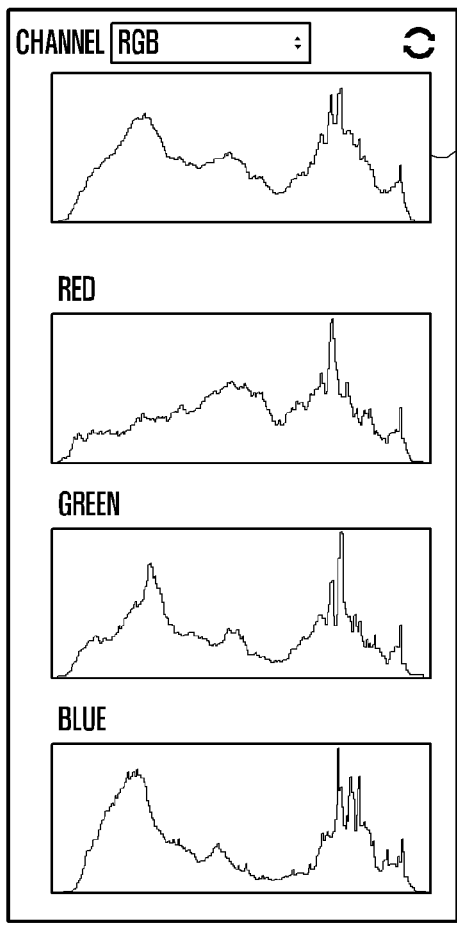
Figure 10:
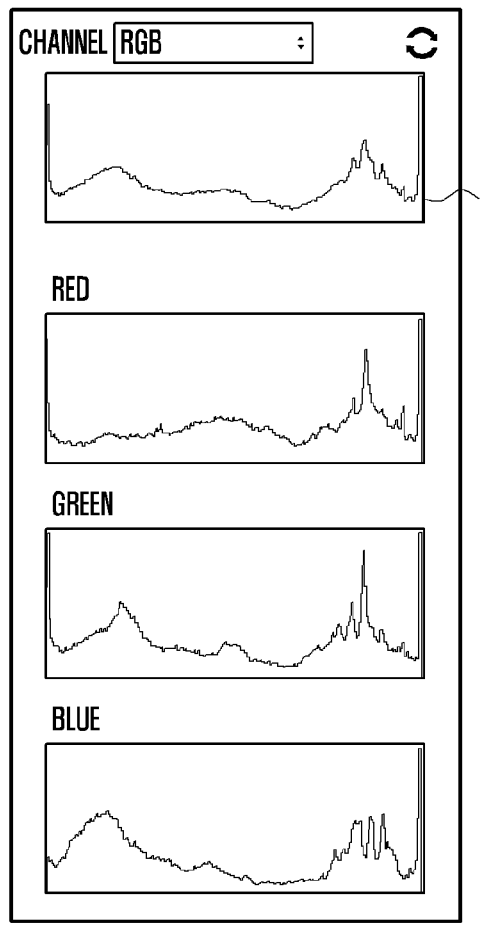

FIG. 10 is a diagram illustrating an image processing method according to various embodiments of the disclosure.

According to various embodiments, FIG. 10 shows that a dominant color of pixels in image data 1010 acquired using the camera module (e.g., 430 in FIG. 4) is red, the context information is an outdoor position, and the scene is man-made.

Referring to FIG. 10, the image analyzing module (e.g., 620 in FIG. 6) may extract first parameters from the image data 1010. For example, the first parameters of the image data 1010 may be as shown in Table 7 below.

TABLE 7

| Contrast       | 0.56 | Highlight | 0.23 |
|----------------|------|-----------|------|
| redDominance   | 0.91 | Lowlight  | 0.28 |
| greenDominance | 0.05 | Median    | 114  |

TABLE 7-continued

| blueDominance | 0.04 | lowRGB | (0.35, 0.29, 0.23) |
|---|---|---|---|
| | | highRGB | (0.74, 0.74, 0.73) |

According to various embodiments, the image analyzing module may deliver the extracted first parameters of the image data 1010 to the parameter determining module (e.g., 660 in FIG. 6).

According to various embodiments, the context information detecting module (e.g., 630 in FIG. 6) may determine the context information of the electronic device as an outdoor position and then deliver it to the scene classifying module (e.g., 650 in FIG. 6). In addition, the scene detecting module (e.g., 640 in FIG. 6) may determine the scene of the image data 1010 as manmade and then deliver it to the scene classifying module.

According to various embodiments, the scene classifying module may determine the scene to be manmade through a predefined algorithm, based on the received context information and the received scene.

According to various embodiments, the scene classifying module may deliver the determined scene, e.g., manmade, to the parameter determining module.

According to various embodiments, the parameter determining module may acquire second parameters through an algorithm as shown in Table 8 below, based on the first parameters and the scene (e.g., manmade).

TABLE 8

For Manmade Scene following equations are used for calculating Artist Params
saturation_green= (greenDominance*100);
saturation_red= (redDominance*100);
saturation_blue= (blueDominance*100);
arParams.saturation=(saturation_red+saturation_green+saturation_blue)/6.0f;
arParams.contrast= (contrast*100)/2.0;
arParams.shadow= (highlight*100)/2.0f;
arParams.highlight= (lowlight*100)/2.0f;
arParams.lowR= lowR;
arParams.lowG= lowG;
arParams.lowB= lowB;
arParams.highR= highR;
arParams.highG= highG;
arParams.highB= highB;

Because the contrast is at a proper level, the color dominance is red, the highlight/shadow are at low levels, the scene is a manmade scene, the algorithm for acquiring the second parameters may set the saturation, based on an average value of the red/green/blue saturations, and increase the highlight/shadow by the same level. The second parameters acquired through the above algorithm may be as shown in Table 9 below.

TABLE 9

| Camera Highlight | 14.82 | Median | 144 |
|---|---|---|---|
| Camera Shadows | 11.00 | lowRGB | (0.35, 0.29, 0.23) |
| Camera Contrast | 28.5 | highRGB | (0.74, 0.74, 0.73) |
| Camera Saturation | 16.67 | | |

The parameter determining module may deliver the acquired second parameters to the graphic processing module (e.g., 680 in FIG. 6).

According to various embodiments, the graphic processing module may generate, based on the second parameters, a new image data 1020 acquired using the camera module. The electronic device (e.g., the processor 120, 210, or 470) may display the generated image data 1020.

According to various embodiments, comparing a histogram 1030 for color information of the image data 1010 with a histogram 1040 for color information of the new image data 1020 generated based on the second parameters, it can be seen that the histogram 1040 (e.g., a histogram 1045) for the color information of the image data 1020 generated based on the second parameters represents more uniform dispersion than the histogram 1030 (e.g., a histogram 1035) for the color information of the image data 1010.

In addition to the above-described embodiments, the electronic device may also implement the following embodiments. Now, other various embodiments will be described.

According to various embodiments, it is assumed that a dominant color of pixels in first image data acquired using the camera module (e.g., 430 in FIG. 4) is red, the context information is an outdoor position, and the scene is natural. In this case, parameters of the first image may indicate that the contrast is at a proper level, the color dominance is red, the shadow region is at a high level, the context information is an outdoor position, and the scene is a natural scene, so that the algorithm for acquiring second parameters to be used in generating second image data acquired using the camera module may determine the camera saturation, based on the color dominance of red, and also process the highlight region to brighten by considering the high-level shadow region.

According to various embodiments, it is assumed that a dominant color of pixels in first image data acquired using the camera module (e.g., 430 in FIG. 4) is blue, the context information is an outdoor position, and the scene is manmade. In this case, parameters of the first image may indicate that the contrast is at a proper level, the color dominance is blue, the highlight/shadow regions are at a low level, the context information is an outdoor position, and the scene is a manmade scene, so that the algorithm for acquiring second parameters to be used in generating second image data acquired using the camera module may determine the camera saturation, based on an average value of the red/green/blue saturations, and also increase the highlight/shadow regions by the same level by considering the low-level highlight/shadow regions.

According to various embodiments, it is assumed that a dominant color of pixels in first image data acquired using the camera module (e.g., 430 in FIG. 4) is red, the context information is an indoor position, and the scene is noclass. In this case, parameters of the first image may indicate that the contrast is at a high level, the color dominance is red, the highlight/shadow regions are at a low level, the context information is an indoor position, and the scene is a noclass scene, so that the algorithm for acquiring second parameters to be used in generating second image data acquired using the camera module may determine the camera saturation, based on the green saturation, and also increase the highlight/shadow regions by the same level by considering the low-level highlight/shadow regions.

According to various embodiments, it is assumed that a dominant color of pixels in first image data acquired using the camera module (e.g., 430 in FIG. 4) is red, the context information is an indoor position, and the scene is noclass. In this case, parameters of the first image may indicate that the contrast is at a high level, the color dominance is red, the highlight/shadow regions are at a low level, the context information is an indoor position, and the scene is a noclass scene, so that the algorithm for acquiring second parameters to be used in generating second image data acquired using the camera module may determine the camera saturation, based on the green saturation, and also increase the highlight/shadow regions by the same level by considering the low-level highlight/shadow regions.

Figure 11A:
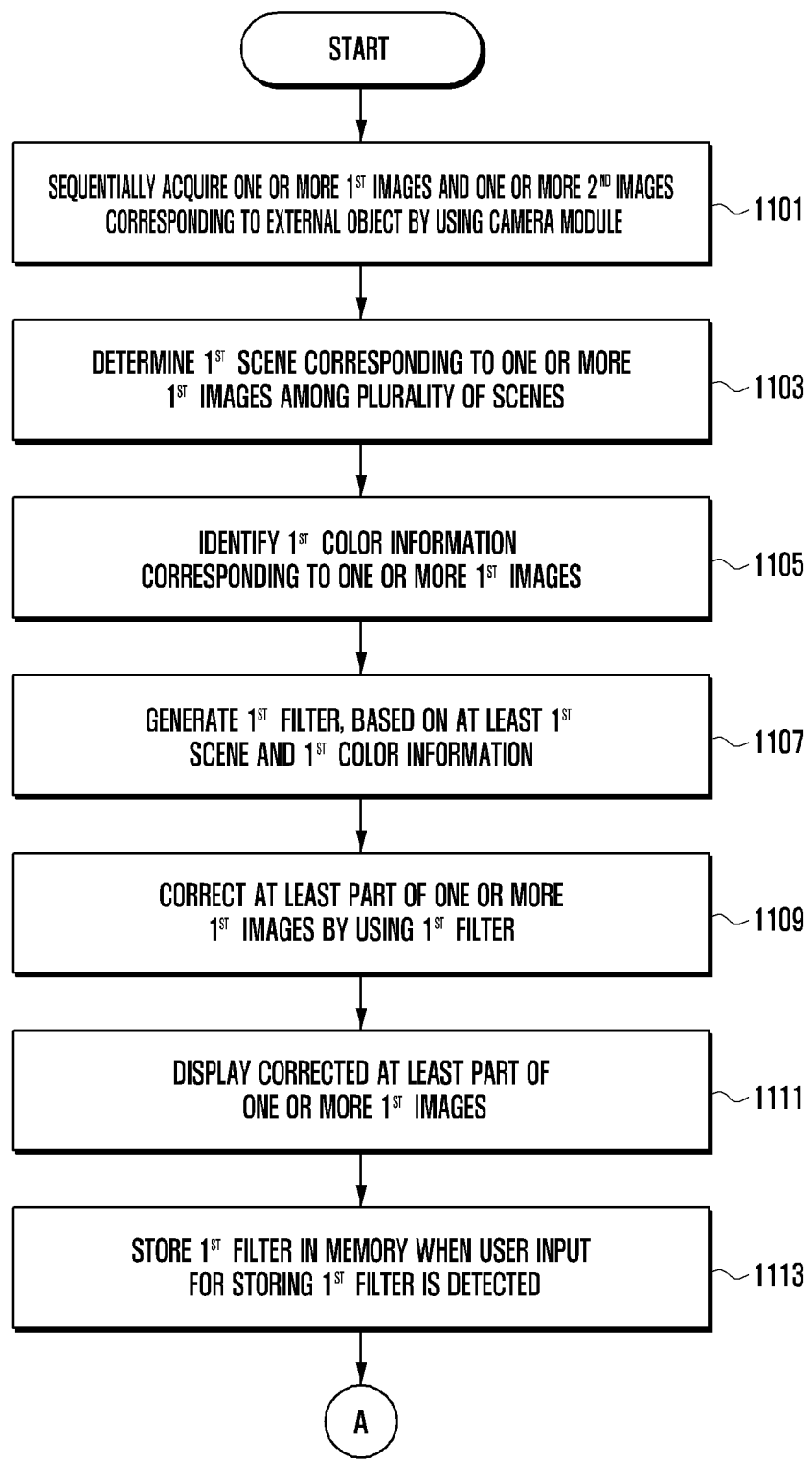
FIGS. 11A and 11B are flow diagrams illustrating an image processing method according to various embodiments of the disclosure.
Figure 11B:
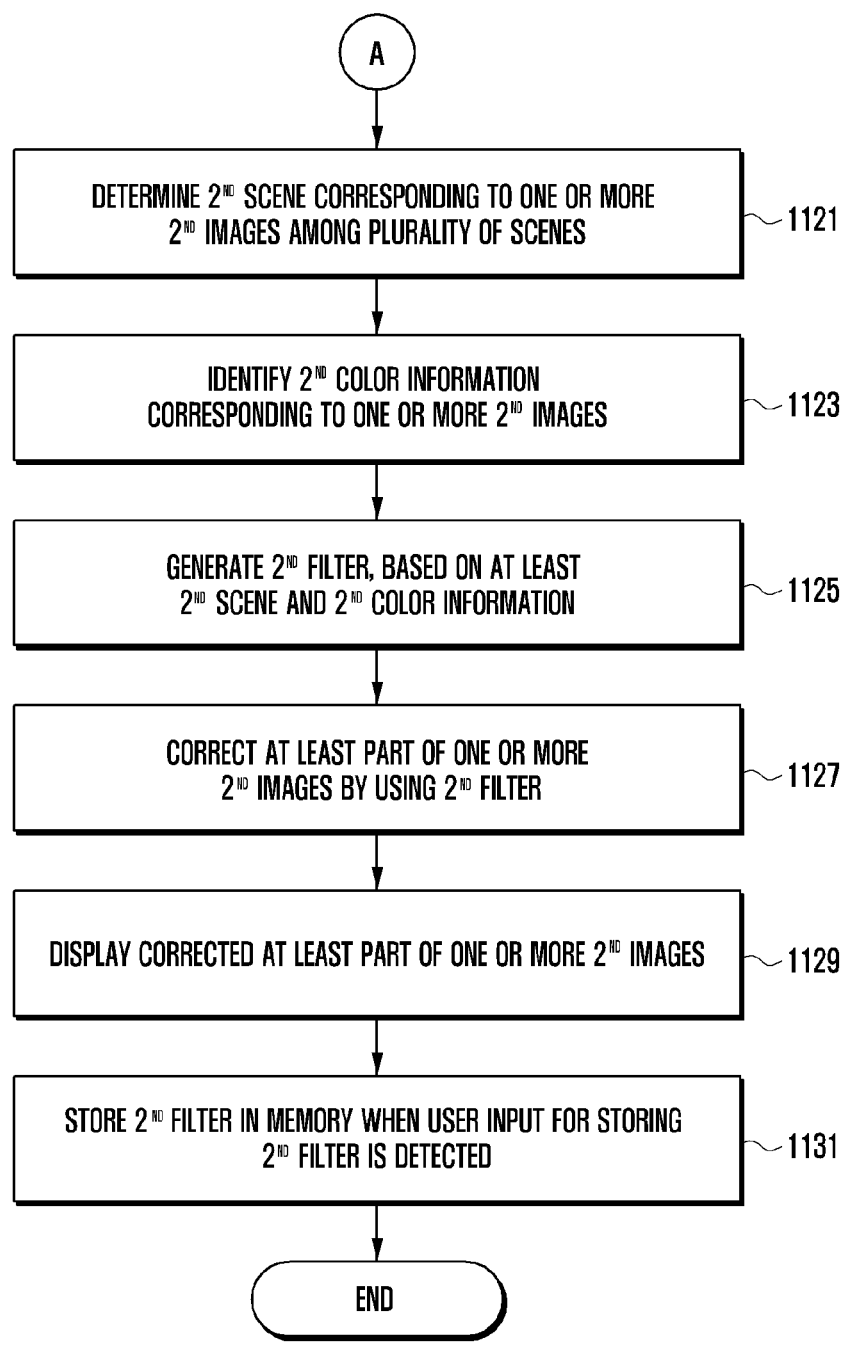

FIGS. 11A and 11B are flow diagrams illustrating an image processing method according to various embodiments of the disclosure.

Referring to FIGS. 11A and 11B, at operation 1101, an electronic device (e.g., the processor 120, 210, or 470) may sequentially acquire one or more first images and one or more second images, both corresponding to external objects, by using a camera module (e.g., 430 in FIG. 4).

According to various embodiments, at operation 1103, the electronic device (e.g., the processor 120, 210, or 470) may determine a first scene corresponding to the acquired one or more first images. For example, the electronic device may determine the first scene corresponding to the first images, based on a plurality of scenes previously stored in a memory (e.g., 420 in FIG. 4).

According to various embodiments, at operation 1105, the electronic device (e.g., the processor 120, 210, or 470) may identify first color information corresponding to the one or more first images. For example, the first color information may include at least one of hue, saturation, contrast, brightness, color information (e.g., RGB), or an RGB average.

According to various embodiments, at operation 1107, the electronic device (e.g., the processor 120, 210, or 470) may generate a first filter, based on at least the first scene and the first color information.

According to various embodiments, the electronic device may acquire context information about an ambient environment thereof by using a sensor module (e.g., 450 in FIG. 4). Then, based on at least the first scene, the first color information, and the context information, the electronic device may generate the first filter.

According to various embodiments, the electronic device (e.g., the processor 120, 210, or 470) may correct at least a part of the one or more first images by using the first filter at operation 1109, and display the corrected at least a part of the one or more first images on a display (e.g., the touch screen display 460 in FIG. 4) at operation 1111.

According to various embodiments, at operation 1113, the electronic device (e.g., the processor 120, 210, or 470) may store the first filter in the memory when a user input for storing the first filter is detected. The operation 1113 may or may not be performed depending on whether the user input is detected or not.

According to various embodiments, at operation 1121, the electronic device (e.g., processor 120, 210, or 470) may determine a second scene corresponding to the acquired one or more second images. For example, the electronic device (e.g., the processor 120, 210, or 470) may determine the second scene corresponding to the second images, based on a plurality of scenes previously stored in the memory.

According to various embodiments, at operation 1123, the electronic device (e.g., the processor 120, 210, or 470) may identify second color information corresponding to the one or more second images. Then, at operation 1125, the electronic device may generate a second filter, based at least on the second scene and the second color information.

According to various embodiments, the electronic device (e.g., the processor 120, 210, or 470) may correct at least a part of the one or more second images by using the second filter at operation 1127, and display the corrected at least a part of the one or more second images on the display at operation 1129.

According to various embodiments, the electronic device may calculate a variation (e.g., Equation 1 described above in FIG. 7) between a parameter corresponding to the first filter generated at the above operation 1107 and a parameter corresponding to the second filter generated at the above operation 1123. Then, based on the second filter and the calculated variation, the electronic device may correct and display at least a part of the one or more second images.

According to various embodiments, at operation 1131, the electronic device (e.g., the processor 120, 210, or 470) may store the second filter in the memory when a user input for storing the second filter is detected. The operation 1131 may or may not be performed depending on whether the user input is detected or not.

Figure 12:
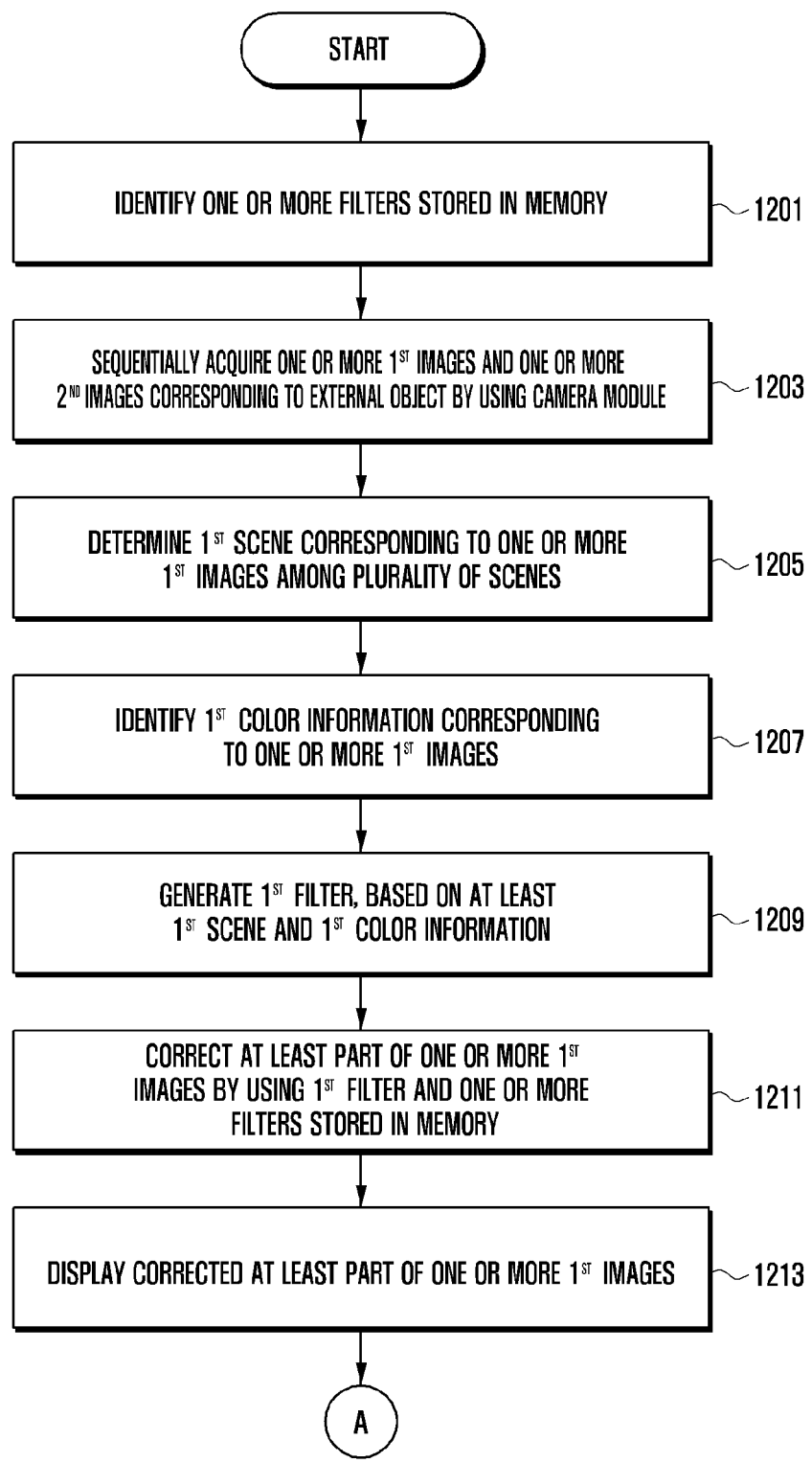
FIG. 12 is a flow diagram illustrating an image processing method according to various embodiments of the disclosure.

FIG. 12 is a flow diagram illustrating an image processing method according to various embodiments of the disclosure.

According to various embodiments, operations 1203 to 1209 in FIG. 12 are the same as the above-described operations 1101 to 1107 in FIG. 11A, so that the same operations will be not repeatedly described or will be briefly described in the followings.

Referring to FIG. 12, at operation 1201, an electronic device (e.g., the processor 120, 210, or 470) may identify one or more filters stored in a memory (e.g., 420 in FIG. 4).

According to various embodiments, at operations 1203 to 1207, the electronic device (e.g., the processor 120, 210, or 470) may determine a first scene corresponding to one or more first images, which correspond to at least one external object and are acquired using a camera module (e.g., 430 in FIG. 4), and identify first color information corresponding to the one or more first images. Then, at operation 1209, the electronic device (e.g., the processor 120, 210, or 470) may generate a first filter, based on at least the first scene and the first color information.

According to various embodiments, the electronic device (e.g., the processor 120, 210, or 470) may correct at least a part of the one or more first images by using the first filter and the one or more filters stored in the memory at operation 1211, and display the corrected at least a part of the one or more first images on a display (e.g., the touch screen display 460 in FIG. 4) at operation 1213. Thereafter, the electronic device (e.g., the processor 120, 210, or 470) may perform the above-described operations 1121 to 1131 of FIG. 11B.

While the disclosure has been described in detail with reference to specific embodiments, it is to be understood that various changes and modifications may be made without departing from the scope of the disclosure. Therefore, the scope of the disclosure should not be limited by embodiments described herein, but should be determined by the scope of the appended claims and equivalents thereof.

The invention claimed is:

1. An electronic device comprising:
a camera;
a memory; and
a processor electrically connected to the camera and the memory,
wherein the processor is configured to:
extract a first parameter of first image data acquired using the camera,
detect context information about the electronic device by using a sensor or a microphone functionally connected to the electronic device,
detect a scene corresponding to the first image data from a plurality of predefined scenes,
acquire a second parameter, based on the first parameter, the context information, and the scene,
generate second image data acquired using the camera, based on the second parameter,
display the second image data by using a display functionally connected to the electronic device, and
generate a filter based on the second parameter and store the generated filter in the memory.

2. The electronic device of claim 1, wherein the processor is further configured to:
when an input for fixing the second parameter is detected while displaying the second image data, maintain a state of applying the second parameter,
when an input for releasing the fixed second parameter is detected while maintaining the second parameter applied state, acquire a third parameter of image data acquired when or before the releasing input is detected, and
based on the acquired third parameter, generate and display third image data acquired using the camera.

3. The electronic device of claim 1, wherein the processor is further configured to:
display the second image data by changing, based on the second parameter, at least some pixels in the first image data acquired from the camera.

4. The electronic device of claim 1, wherein the processor is further configured to:
store each of the first image data and the second image data in the memory.

5. The electronic device of claim 4, wherein the processor is further configured to:
store the acquired second parameter in the memory, and
perform post-processing on the first image data stored in the memory, based on the stored second parameter.

6. The electronic device of claim 1, wherein the processor is further configured to:
when a specific subject is detected from the first image data, detect the scene based on the detected specific subject.

7. The electronic device of claim 1, wherein the processor is further configured to:
calculate an average variation of the second parameter, based on the first image data acquired using the camera, and
generate the second image data acquired using the camera, based on the calculated average variation of the second parameter.

8. A method for processing an image in accordance with a camera photographing environment and a scene in an electronic device, the method comprising:
extracting a first parameter of first image data acquired using a camera;
detecting context information about the electronic device by using a sensor or a microphone functionally connected to the electronic device;
detecting a scene corresponding to the first image data from a plurality of predefined scenes;
acquiring a second parameter, based on the first parameter, the context information, and the scene;
generating and displaying, on a display, second image data acquired using the camera, based on the second parameter; and
generating a filter based on the second parameter and storing the generated filter in a memory.

9. The method of claim 8, further comprising:
when an input for fixing the second parameter is detected while displaying the second image data, maintaining a state of applying the second parameter;
when an input for releasing the fixed second parameter is detected while maintaining the second parameter applied state, acquiring a third parameter of image data acquired when or before the releasing input is detected; and
based on the acquired third parameter, generating and displaying third image data acquired using the camera.

10. The method of claim 8, wherein the detecting the scene of the first image data includes:
when a specific subject is detected from the first image data, detecting the scene based on the detected specific subject.

11. The method of claim 8, further comprising:
calculating an average variation of the second parameter, based on the first image data acquired using the camera,
wherein the generating and displaying the second image data includes:
generating and displaying the second image data acquired using the camera, based on the calculated average variation of the second parameter.

12. An electronic device comprising:
a camera;
a touch screen display;
a memory; and
a processor electrically connected to the camera, the touch screen display, and the memory,
wherein the processor is configured to:
sequentially acquire one or more first images and one or more second images, both corresponding to external objects, by using the camera,
determine a first scene corresponding to the one or more first images among a plurality of scenes,
identify first color information corresponding to the one or more first images,
generate a first filter, based on at least the first scene and the first color information,
correct at least a part of the one or more first images by using the first filter,
display the corrected at least the part of the one or more first images by using the touch screen display,
determine a second scene corresponding to the one or more second images among the plurality of scenes,
identify second color information corresponding to the one or more second images,
generate a second filter, based on at least the second scene and the second color information,
correct at least a part of the one or more second images by using the second filter, and
display the corrected at least the part of the one or more second images by using the touch screen display.

13. The electronic device of claim 12, wherein the processor is further configured to:
- after sequentially acquiring the one or more first images and the one or more second images,
- acquire context information about an ambient environment of the electronic device by using a sensor functionally connected to the electronic device, and generate the first filter, further based on the context information, or
- correct at least a part of the one or more second images, further based on a variation between a parameter corresponding to the first filter and a parameter corresponding to the second filter.

14. The electronic device of claim 12, wherein the processor is further configured to:
- identify one or more filters stored in the electronic device before acquiring the one or more first images, and
- correct at least the part of the one or more first images by further using the one or more filters.

15. The electronic device of claim 12, wherein the processor is further configured to:
- store the first filter in the memory in response to a user input received while displaying the corrected at least the part of the one or more first images on the touch screen display.

* * * * *